United States Patent
Yiu et al.

(10) Patent No.: US 11,510,114 B2
(45) Date of Patent: Nov. 22, 2022

(54) EXIT CONDITIONS FOR CONDITIONAL HANDOVERS AND BEAM BASED MOBILITY STATE ESTIMATION

(71) Applicant: Apple Inc., Cupertino, CA (US)

(72) Inventors: Candy Yiu, Portland, OR (US); Ansab Ali, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/479,482

(22) PCT Filed: Feb. 22, 2018

(86) PCT No.: PCT/US2018/019124
§ 371 (c)(1),
(2) Date: Jul. 19, 2019

(87) PCT Pub. No.: WO2018/156696
PCT Pub. Date: Aug. 30, 2018

(65) Prior Publication Data
US 2019/0387440 A1  Dec. 19, 2019

Related U.S. Application Data

(60) Provisional application No. 62/463,894, filed on Feb. 27, 2017, provisional application No. 62/466,873, filed on Mar. 3, 2017.

(51) Int. Cl.
*H04W 36/00* (2009.01)
*H04W 36/16* (2009.01)

(52) U.S. Cl.
CPC ............... *H04W 36/0072* (2013.01); *H04W 36/00837* (2018.08); *H04W 36/165* (2013.01)

(58) Field of Classification Search
CPC ......... H04W 36/0016; H04W 36/0055; H04W 36/0061; H04W 36/0088; H04W 36/08; H04W 36/16; H04W 36/18; H04W 36/30; H04W 36/0072
USPC .................................... 370/310, 328, 331
See application file for complete search history.

(56) References Cited

U.S. PATENT DOCUMENTS

| | | | | |
|---|---|---|---|---|
| 9,173,151 | B2 * | 10/2015 | Choi | H04W 36/00837 |
| 9,521,605 | B2 * | 12/2016 | Oh | H04W 36/30 |
| 9,591,545 | B2 * | 3/2017 | Tamura | H04W 36/38 |
| 9,622,139 | B2 * | 4/2017 | Legg | H04W 36/30 |
| 9,749,926 | B2 * | 8/2017 | Muller | H04W 36/00837 |
| 9,888,420 | B2 * | 2/2018 | Miranda | H04W 36/0016 |
| 9,924,422 | B2 * | 3/2018 | Kim | H04W 36/0088 |
| 10,536,890 | B2 * | 1/2020 | Basu Mallick | H04W 36/0005 |

(Continued)

FOREIGN PATENT DOCUMENTS

| | | |
|---|---|---|
| CN | 101321375 A | 12/2008 |
| CN | 102577503 A | 7/2012 |

(Continued)

OTHER PUBLICATIONS

International Patent Office—International Search Report and Written Opinion dated Jul. 3, 2018, from International Application No. PCT/US2018/019124, 20 pages.

(Continued)

*Primary Examiner* — Jason E Mattis
(74) *Attorney, Agent, or Firm* — Sterne, Kessler, Goldstein & Fox P.L.L.C.

(57) ABSTRACT

Methods, systems, and storage media are provided for exiting conditional handovers and for estimating a user equipment mobility state. Other embodiments may be described and/or claimed.

20 Claims, 17 Drawing Sheets

(56) References Cited

U.S. PATENT DOCUMENTS

| | | | |
|---|---|---|---|
| 10,542,469 B2* | 1/2020 | Kang | H04W 36/0069 |
| 2012/0196602 A1 | 8/2012 | Grob-Lipski | |
| 2014/0126545 A1 | 5/2014 | Tamura et al. | |
| 2014/0220979 A1 | 8/2014 | Song et al. | |
| 2014/0378144 A1* | 12/2014 | Legg | H04W 36/30 |
| | | | 455/437 |
| 2014/0378145 A1 | 12/2014 | Legg et al. | |
| 2018/0098258 A1* | 4/2018 | Annam | H04W 24/10 |
| 2019/0281511 A1* | 9/2019 | Susitaival | H04W 36/36 |
| 2019/0387440 A1* | 12/2019 | Yiu | H04W 36/0072 |
| 2020/0077319 A1* | 3/2020 | Lunden | H04W 36/36 |

FOREIGN PATENT DOCUMENTS

| | | |
|---|---|---|
| CN | 104170470 A | 11/2014 |
| CN | 104782179 A | 7/2015 |
| WO | 2010057127 A1 | 5/2010 |
| WO | WO 2016/130062 A1 | 8/2016 |

OTHER PUBLICATIONS

Ericsson, "Inter-cell Handover in NR," 3GPP TSG-RAN WG2 Meeting #96, R2-168730, Agenda Item: 9.3.1.1.1, Nov. 14-18, 2016, Reno, Nevada, USA, 7 pages.

Ericsson, "Conditional Handover," 3GPP TSG-RAN WG2 #97, Tdoc R2-1700864, Agenda Item: 10.3.1.1.2, Jan. 13-17, 2017, Athens, Greece, 5 pages.

Oppo, "Discussion on Handover Procedure Optimization," 3GPP TSG-RAN 2#97, R2-1700956, Agenda Item 10.3 1 1.2, Feb. 13-17, 2017, Athens, Greece, 3 pages.

3GPP, "Technical Specification Group Radio Access Network; Evolved Universal Terrestrial Radio Access (E-UTRA) User Equipment (UE) procedures in idle mode Release 14)," 3GPP TS 36.304 V14.1.0 (Jun. 2016), Lte Advanced Pro, 46 pages.

Chinese Application No. 201880013609.9, First Office Action and Search Report dated May 27, 2021, with attached English Translation of Office Action from EPO Global Dossier, 18 pages.

* cited by examiner

EXIT CONDITIONS FOR CONDITIONAL HANDOVERS AND BEAM BASED MOBILITY STATE ESTIMATION

RELATED APPLICATIONS

The present application is a national phase entry under 35 U.S.C. § 371 of International Application No. PCT/US2018/019124, filed Feb. 22, 2018, entitled "EXIT CONDITIONS FOR CONDITIONAL HANDOVERS AND BEAM BASED MOBILITY STATE ESTIMATION," which claims priority under 35 U.S.C. § 119 to U.S. Provisional Application No. 62/463,894 filed Feb. 27, 2017 and U.S. Provisional Application No. 62/466,873 filed Mar. 3, 2017, the contents of each of which are hereby incorporated by reference in their entireties.

FIELD

Various embodiments of the present application generally relate to the field of wireless communications, and in particular, to conditional handovers and mobility state estimation.

BACKGROUND

Future implementations of Third Generation Partnership Project (3GPP) new radio (NR) systems may support conditional handovers in order to support stringent latency requirements and fast moving user equipment (UEs). Conditional handovers may involve a UE sending a measurement report to a source cell, followed by the reception of a conditional handover command from the network. The conditional handover command may indicate a condition for the UE to perform a handover procedure. In this case, the UE must wait until the condition is met before the handover is performed. Conditional handovers may lead to better handover failure performance when compared to legacy handover procedures.

However, handover failures may occur when the handover condition is not met, for example, when a UE moves close to a cell edge or boundary and then comes to a stop.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
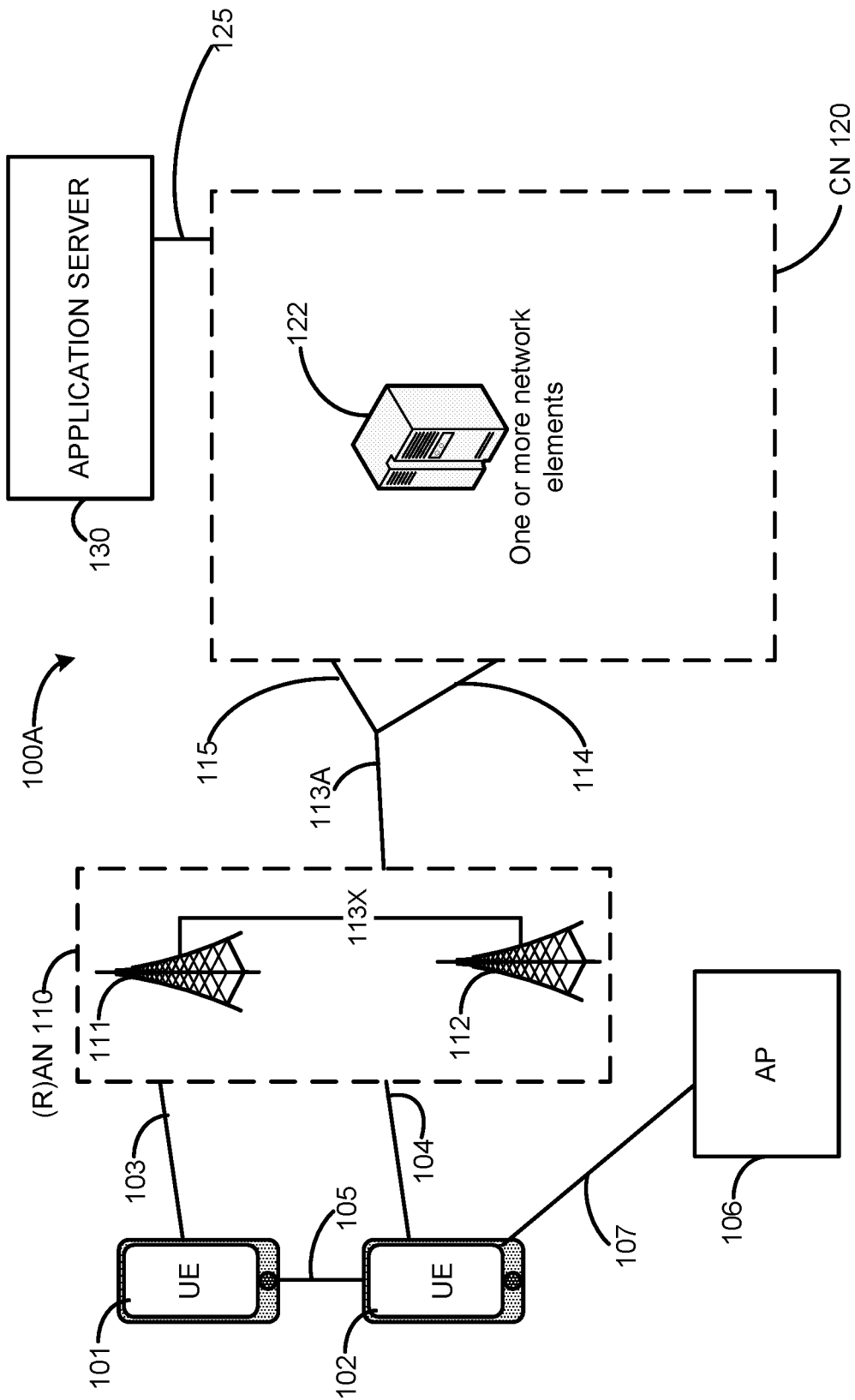
FIG. 1A illustrates an example system architecture of a network, in accordance with various embodiments.

Embodiments discussed herein relate to conditional handovers and mobility state estimation. In embodiments, a conditional handover (CHO) command may indicate a first condition and a second condition. The first condition may indicate a condition to execute a handover (HO) of the CHO and the second condition may indicate a condition to not execute the HO or discard the CHO command. A user equipment (UE) may perform an HO procedure when the first condition is met before the second condition is met; and may discard the CHO command when the second condition is met and the first condition is not met. In addition, the UE may identify a plurality of mobility state estimation (MSE) thresholds from a configuration message. Each of the MSE thresholds may correspond to an MSE value. The UE may determine an MSE of the UE to be an individual MSE value when a value of a mobility counter is less than or equal to an MSE threshold that corresponds with the individual MSE value. Furthermore, the UE may count a number of beam switches and/or a number of transmission-reception point (TRP) switches that occur within a time period, and may estimate a current mobility state based on the number of beam switches and/or the number of TRP switches. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

FIG. 1A illustrates an architecture of a system 100A of a network, in accordance with various embodiments. The following description is provided for an example system 100A that operates in conjunction with the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as Long Term Evolution (LTE), future (for example, Sixth Generation (6G)) systems, and the like.

As shown by FIG. 1A, the system 100A may include user equipment (UE) 101 and UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (for example, handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 101 and 102 can comprise an IoT UE, which can comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

The UEs 101 and 102 may be configured to connect, for example, communicatively couple, with a access network (AN) or radio access network (RAN) 110. In embodiments, the RAN 110 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Spécial Mobile) EDGE (GSM Evolution) Radio Access Network). As used herein, the term "NG RAN" or the like may refer to a RAN 110 that operates in an NR or 5G system 100A, and the term "E-UTRAN" or the like may refer to a RAN 110 that operates in an LTE or 4G system 100A. The UEs 101 and 102 utilize connections (or channels) 103 and 104, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 101 and 102 may directly exchange communication data via a ProSe interface 105. The ProSe interface 105 may alternatively be referred to as a sidelink (SL) interface 105 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 (also referred to as also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (for example, connection 107) via Internet Protocol Security (IPsec) protocol tunneling to authenticate and encrypt packets (for example, internet protocol (IP) packets) sent over the connection 107. IPsec tunneling may include encapsulating entirety of original IP packets and adding a new packet header thereby protecting the original header of the IP packets.

The RAN 110 can include one or more AN nodes or RAN nodes 111 and 112 that enable the connections 103 and 104. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (for example, terrestrial access points) or satellite stations providing coverage within a geographic area (for example, a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 111/112 that operates in an NR or 5G system 100A (for example a gNB), and the term "E-UTRAN node" or the like may refer to a RAN node 111/112 that operates in an LTE or 4G system 100A (for example, an eNB). According to various embodiments, the RAN nodes 111 and/or 112 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 111 and/or 112 may be implemented as one or more software entities running on server computers as part of a virtual network, which may be referred to as a cloud radio access network (CRAN). In other embodiments, the RAN nodes 111 and 112 may represent individual gNB-distributed units (DUs) that are connected to a gNB-centralized unit (CU) via an F1 interface (not shown by FIG. 1A).

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (for example, for downlink communications) or a Single Carrier Frequency Division Multiple Access (SC-FDMA) communication technique (for example, for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (for example, assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

Furthermore, UEs 101, 102 may be capable of measuring various channel, link, and/or cell-related criteria, such as channel conditions, signal and/or beam strength or quality (for example, reference signal received power (RSRP), reference signal received quality (RSRQ), signal-to-noise ratio (SNR), signal-to-interference-plus-noise ratio (SINR), and the like), and provide a measurement report (MR) including this information to a RAN node 111, 112. In many deployment scenarios, a UE 101, 102 may undergo a handover (HO) operation when moving between cells. For example, when a UE 101, 102 moves from a cell of RAN node 111 to a cell of RAN node 112, RAN node 111 may handover the UE 101, 102 to RAN node 112. In this case, RAN node 112 may be considered a "source cell," "source RAN node," or a "source eNB," and RAN node 112 may be considered a "target cell," "target RAN node," or a "target eNB." Typically, the source RAN node 111 may send a measurement configuration to the UE 101, 102 to request a measurement report from the UE 101, 102 when certain configured event(s) triggered, and the UE 101, 102 may perform signal quality or cell power measurements for channels or links of the target RAN node 112 and/or other neighboring cells (not shown).

Based on the results of the measurement, some configured events may trigger the UE to send the measurement report to the source RAN node 111. The source RAN node 111 may decide to handover the UE 101, 102 to the target RAN node 112 by initiating the HO operation. To initiate the HO operation, the source RAN node 111 may transmit an HO request message to the target RAN node 112, and in response, the source RAN node 111 may receive an HO request acknowledgement (ACK) from the target RAN node 112. Once the HO request ACK is received, the source RAN node 111 may send an HO command to the UE to begin an attachment process with the target RAN node 112. At this point, the source RAN node 111 stops data transmission to the UE since the UE detaches from the source RAN node 111 and starts synchronization with the target RAN node 112. If the source RAN node 111 still has data intended for the UE, the source RAN node 111 may send a sequence number (SN) status transfer to the target RAN node 112 and forward data to the target RAN node 112 so that the target RAN node 112 can transmit such data to UE 101, 102 once the HO operation is complete.

Conditional handovers (CHOs) may be used in embodiments where system 100A is an NR system. In these embodiments, a UE 101, 102 may be triggered to generate and transmit an early measurement report (MR) to a source cell, followed by the receipt of a CHO command from the network (for example, the source/serving cell). The CHO command may include a threshold or other condition, which indicates when the UE 101, 102 may execute or otherwise initiate an HO to an indicated target cell, and the UE 101, 102 must wait until this condition is met before the HO is performed. The use of CHOs may lead to better HO failure performance when compared to legacy system HO failure performance. However, as shown by FIG. 1B, issues may arise when the condition indicated by the CHO command do not occur or are otherwise not detected by the UE 101, 102.

Figure 1B:
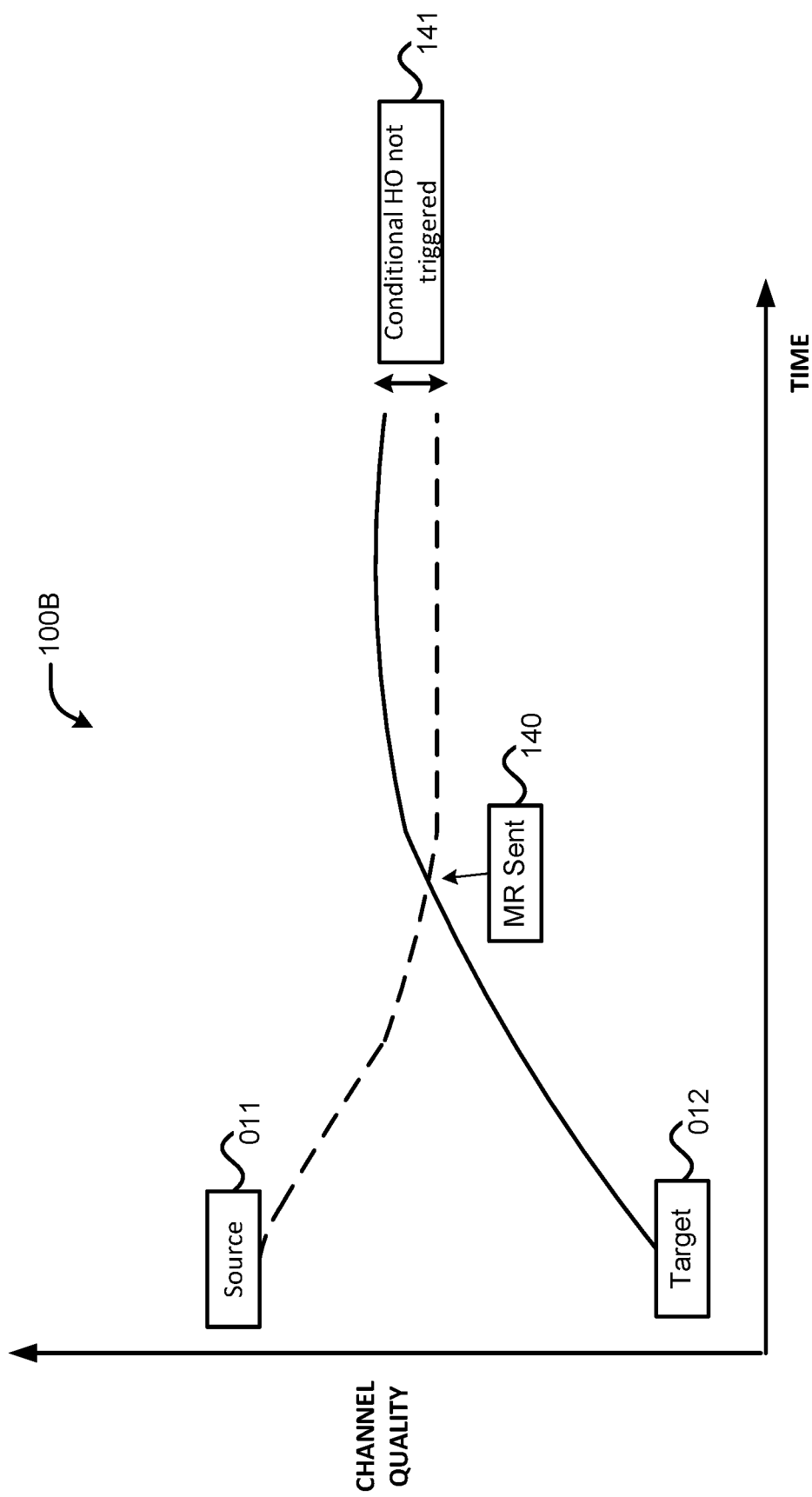
FIGS. 1B-1E illustrate various channel quality graphs in accordance with various embodiments.

Referring to FIG. 1B, which shows a channel quality graph 100B for a scenario where a CHO is not triggered. The graph 100B shows that a UE 101, 102 may be triggered to send an MR at node 140 when the UE 101, 102 detects a signal strength/quality of a source cell or beam 011 (also referred to as "source 011" or the like) to decrease, and an increase in a signal strength/quality of a target cell or beam 012 (also referred to as "target 012" or the like). The source 011 and target 012 may be provided by a same or different RAN node 111, 112, or by different TRxPs of a same RAN node 111, 112. In this scenario, after the MR is sent at node 140, the UE 101, 102 continues to detect that the signal strength of the source 011 is below that of the target 012, but the signal strength of the target 012 does not reach the threshold indicated by the CHO command. Therefore, the UE 101, 102 in this scenario does not trigger the CHO at node 141. This scenario may occur when, for example, the UE 101, 102 moves close to a cell boundary and then comes to a halt.

The use of a two-step CHO scheme in NR as discussed previously relies on the UE 101/102 evaluating source 011 and target cell/beam 012 strength/qualities and comparing the evaluated cell/bea, strength/qualities with different thresholds, for example, a maximum threshold $X_{High}$ (indicated by a CHO command) and a minimum threshold $X_{Low}$ (indicated by a the MR sent at node 140). Due to NR channel characteristics and UE mobility patterns, there can potentially be a number of scenarios where the UE 101/102 sends the MR based on $X_{Low}$ and then waits for the CHO condition to occur, which may potentially take a long time to happen as shown by FIG. 1B, which may lead to poor HO performance. The embodiments shown and describe with respect to FIGS. 1C-1E may alleviate these issues.

Figure 1C:
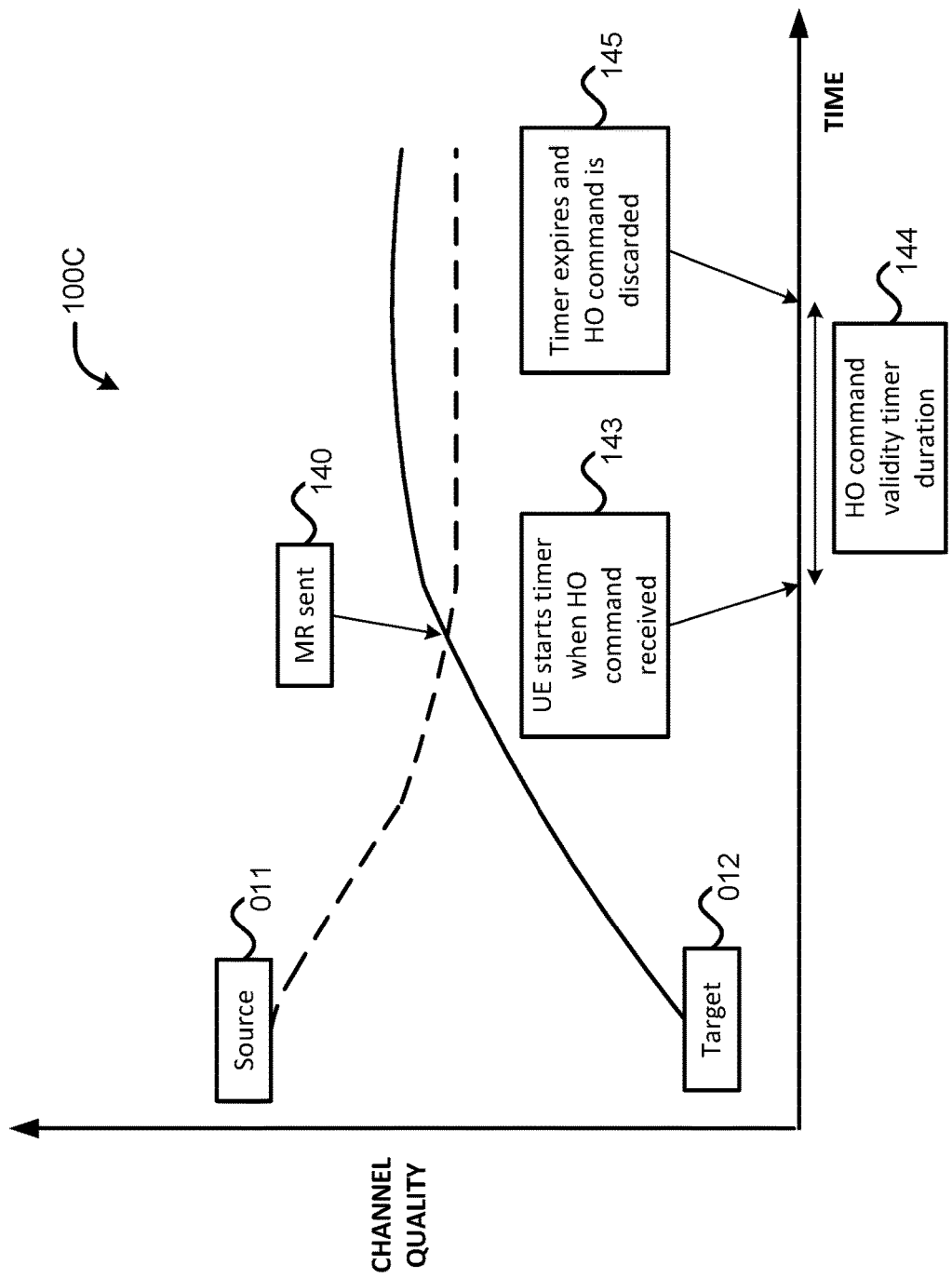

FIG. 1C shows a channel quality graph 100C for a scenario where a timer-based CHO exit condition is used, in accordance with various embodiments. In these embodiments, a validity timer may be associated with the CHO command by the source 011. In such embodiments, the UE 101/102 may start a timer at node 143 in response to receipt of the CHO command for a particular target cell/beam 112. At node 144, the UE 101/102 may periodically or otherwise continue to check the HO execution condition indicated by the CHO command (for example, by comparing the difference between the source 011 and target cell/beam 012 qualities to the $X_{High}$) during a duration of the validity period. If the condition is satisfied before the timer expires, the UE 101/102 may execute the HO with the target cell/beam 112. However, if at node 145 the timer expires before the CHO condition occurs, the UE 101/102 may discard the CHO command and operate as if the CHO command was never received.

The validity timer may be configured in different ways based on various criteria. In a first example, the validity timer may be configured for every CHO command, wherein a single validity timer duration may be indicated in a configuration for one or more target/candidate cells or beams. In a second example, validity timer(s) may be configured per target or candidate entity, wherein one CHO command or configuration may indicate multiple target/candidate cells or beams with individual configurations, and each target/candidate cell or beam may be associated with a corresponding timer duration. Additionally, each of the timers (or timer durations) may be different from one another. In embodiments, CHO command or configuration may indicate a starting time or starting condition for starting the timer. For example, the CHO command or configuration may indicate to start the timer(s) when the CHO command is received by the UE 101/102, when the UE 101/102 detects or estimates that the serving cell/beam signal strength/quality is below a configured or determined threshold; and/or when the UE 101/102 detects or estimates that the target cell or beam is less than a certain signal strength/quality (e.g., X dBs) in comparison to the source 012 cell or beam. Furthermore, the timer may be reset when the HO operation is executed or triggered to execute (for example, when the CHO condition is detected). Moreover, the UE 101/102 may generate and transmit a new MR for the same target cell/beam once the timer for the previous CHO command has expired or reset. Table 1 shows an example configuration or CHO command that may be included in an RRC message to be used for the validity timer based exit condition embodiments. The example of table 1 is based on current LTE standards, but may also be applicable to NR implementations.

TABLE 1

```
-       MobilityControlInfo
The IE MobilityControlInfo includes parameters relevant for network controlled mobility to/within
E-UTRA.
                                   MobilityControlInfo Information Element
-- ASN1START
MobilityControlInfo ::=     SEQUENCE {
    targetPhysCellId                    PhysCellId,
    carrierFreq                         CarrierFreqEUTRA                    OPTIONAL,
    -- Cond HO-toEUTRA2
    carrierBandwidth                    CarrierBandwidthEUTRA               OPTIONAL,
    -- Cond HO-toEUTRA
    additionalSpectrumEmission          AdditionalSpectrumEmission          OPTIONAL,
    -- Cond HO-toEUTRA
    t304                                ENUMERATED {
                                            ms50, ms100, ms150, ms200, ms500, ms1000,
                                            ms2000, ms10000-v1310},
    newUE-Identity                      C-RNTI,
    radioResourceConfigCommon           RadioResourceConfigCommon,
    rach-ConfigDedicated                RACH-ConfigDedicated                OPTIONAL,
    -- Need OP
    ...,
    [[ carrierFreq-v9e0                 CarrierFreqEUTRA-v9e0               OPTIONAL
    -- Need ON
    ]],
    [[ drb-ContinueROHC-r11             ENUMERATED (true)                   OPTIONAL
    -- Cond HO
    ]],
    [[ mobilityControlInfoV2X-r14       MobilityControlInfoV2X-r14          OPTIONAL
    -- Need OR
    ]]
}
MobilityControlInfoSCG-r12 ::=  SEQUENCE {
    t307-r12                        ENUMERATED {
                                        ms50, ms100, ms150, ms200, ms500, ms1000,
                                        ms2000, spare1},
    ue-IdentitySCG-r12              C-RNTI                          OPTIONAL,    --
Cond SCGEst,
    rach-ConfigDedicated-r12        RACH-ConfigDedicated            OPTIONAL,    --
Need OP
    cipheringAlgorithmSCG-r12       CipheringAlgorithm-r12          OPTIONAL,    -- Need ON
    ...
    [[conditionalHORelease-r15      ENUMERATED {
                                        ms50, ms100, ms150, ms200, ms500, ms1000,
                                        ms2000, spare1},                OPTIONAL,    --
```

TABLE 1-continued

```
Need OR]]
}
MobilityControlInfoV2X-r14 ::=   SEQUENCE {
        v2x-CommTxPoolExceptional-r14    SL-CommResourcePoolV2X-r14  OPTIONAL,
        -- Need OR
        v2x-CommRxPool-r14               SL-CommRxPoolListV2X-r14    OPTIONAL,
        -- Need OR
        v2x-CommSyncConfig-r14           SL-SyncConfigListV2X-r14    OPTIONAL
        -- Need OR
}
CarrierBandwidthENTRA ::=        SEQUENCE {
        dl-Bandwidth                     ENUMERATED {
                                                n6, n15, n25, n50, n75, n100, spare10,
                                                spare9, spare8, spare7, spare6, spare5,
                                                spare4, spare3, spare2, spare1},
        ul-Bandwidth                     ENUMERATED {
                                                n6, n15, n25, n50, n75, n100, spare10,
                                                spare9, spare8, spare7, spare6, spare5,
                                                spare4, spare3, spare2, spare1} OPTIONAL
-- Need OP
}
CarrierFreqEUTRA ::=             SEQUENCE {
        dl-CarrierFreq                   ARFCN-ValueEUTRA,
        ul-CarrierFreq                   ARFCN-ValueEUTRA            OPTIONAL     --
Cond FDD
}
CarrierFreqEUTRA-v9e0 ::=        SEQUENCE {
        dl-CarrierFreq-v9e0              ARFCN-ValueEUTRA-r9,
        ul-CarrierFreq-v9e0              ARFCN-ValueEUTRA-r9         OPTIONAL     -- Cond
FDD
}
-- ASN1STOP
```

In the example of table 1, the MobilityControlInfo information element (IE) may include a condition HO release field (conditionalHORelease-r15) that includes a validity timer duration in milliseconds (ms). In this example, the value "ms50" may refer to 50 ms, "ms100" may refer to 100 ms, and so forth. Where multiple timers are to be set/configured for individual cells or beams, the MobilityControlInfo IE may include multiple conditionalHORelease-r15 fields, each of which may include their own validity timer values.

Figure 1D:
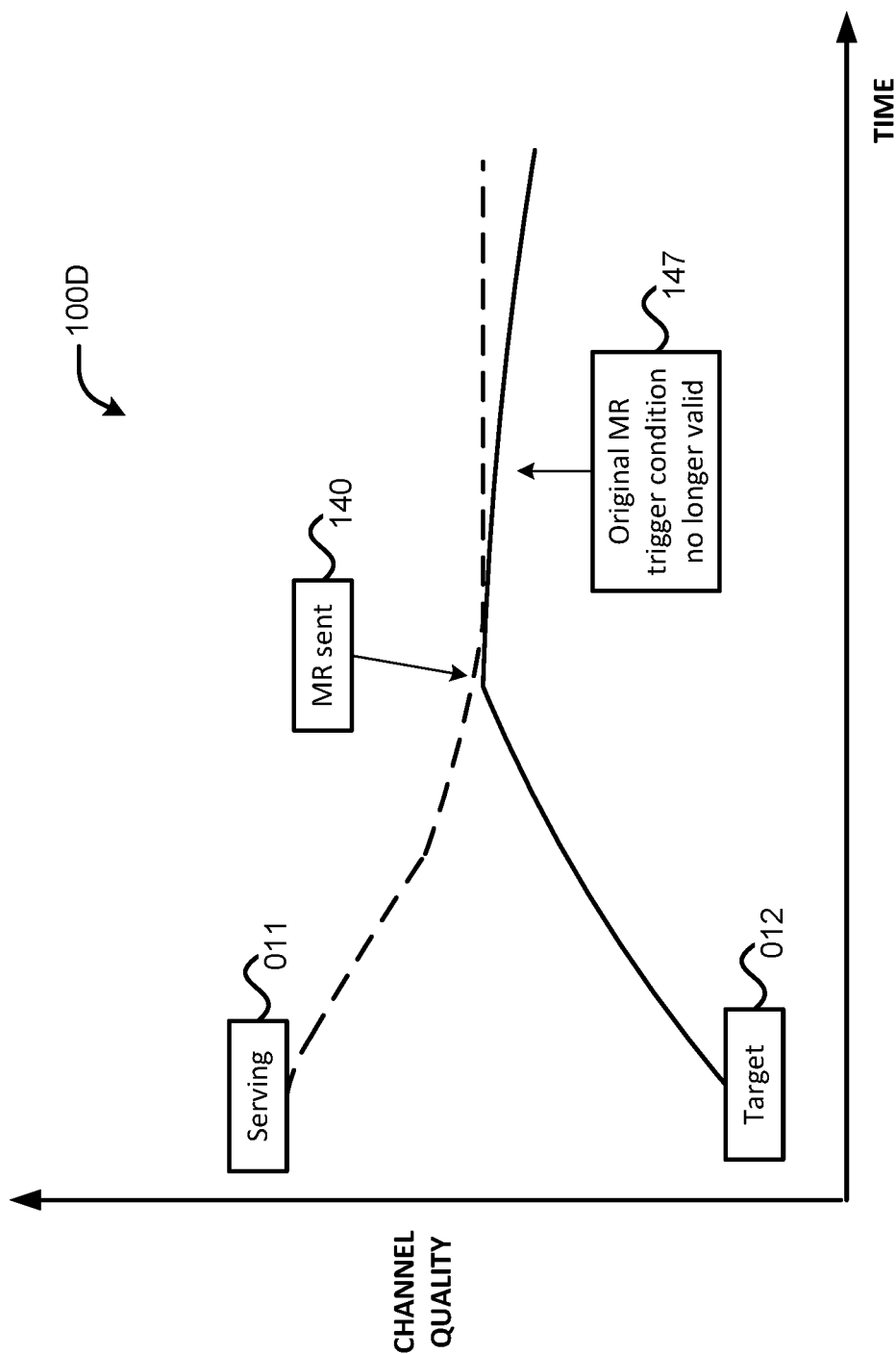

FIG. 1D shows a channel quality graph 100D for a scenario where an event-based CHO exit condition is used, in accordance with various embodiments. In these embodiments, the CHO command may be discarded in response to the detection of an indicated or configured event. The event may be measurement/detection of a target or serving cell strength/quality dropping below a threshold, a difference between the source 011 and target 012 cell or beam strengths/qualities, or some other event. In the example of FIG. 1D, the event-based exit condition may be a different between the source 011 and target 012 cell or beam SINR dropping below the MR threshold $X_{Low}$. As shown by the graph 100D, the UE 101/102 may send the MR at node 140, and over time, the signal strength/quality of the target cell/beam 012 may decrease. In this case, since the difference between the source 011 and target 012 cell/beam SINRs becomes less than $X_{Low}$ (MR threshold), the UE 101/102 may determine that the target cell/beam 012 is no longer better than the source cell/beam 011. Therefore, the UE 101/102 in this scenario may discard the CHO command at node 147. After discarding the CHO command, the UE 101/102 may send a new MR for any potentially new target 012 cells/beams (not shown by FIG. 1D).

In various embodiments, the event-based exit condition may be defined using a certain decibel (dB) threshold. For example, a CHO command or configuration may indicate the event to be when target cell/beam SINR is less than or equal to (<=) 1 dB higher than the source cell/beam 011 SINR.

In some embodiments, the exit condition may be added directly in the event configuration, as is shown by table 2. Table 2 shows an example RRC message IE for event A3 according to current LTE standards with additions or changes to include the CHO exit condition. However, the example of table 2 may also be applicable to other LTE event configurations and/or applicable to NR implementations.

TABLE 2

```
-     ReportConfigEUTRA
The IE ReportConfigEUTRA specifies criteria for triggering of an E-UTRA measurement reporting event.
The E-UTRA measurement reporting events concerning CRS are labelled AN with N equal to 1, 2 and so
on.
   Event 1:   Serving becomes better than absolute threshold;
   Event A2:  Serving becomes worse than absolute threshold;
   Event A3:  Neighbour becomes amount of offset better than PCell/PSCell;
   Event A4:  Neighbour becomes better than absolute threshold;
   Event A5:  PCell/PSCell becomes worse than absolute threshold1 AND Neighbour becomes better
than another absolute threshold2;
   Event A6:  Neighbour becomes amount of offset better than SCell.
```

TABLE 2-continued

The E-UTRA measurement reporting events concerning CSI-RS are labelled CN with N equal to 1 and 2.
  Event C1:  CSI-RS resource becomes better than absolute threshold;
  Event C2:  CSI-RS resource becomes amount of offset better than reference CSI-RS resource.
The E-UTRA measurement reporting events concerning CBR are labelled VN with N equal to 1 and 2.
  Event V1:  CBR becomes larger than absolute threshold;
  Event V2:  CBR becomes smaller than absolute threshold.

ReportConfigEUTRA information element

```
-- ASN1START
ReportConfigEUTRA ::=          SEQUENCE {
    triggerType                    CHOICE {
        event                          SEQUENCE {
            eventId                        CHOICE {
                event1                         SEQUENCE {
                    1-Threshold                    ThresholdEUTRA
                },
                eventA2                        SEQUENCE {
                    a2-Threshold                   ThresholdEUTRA
                },
                eventA3                        SEQUENCE {
                    a3-Offset                      INTEGER (-30..30),
                    a3-OffsetLeave                 INTEGER (-30..30),
                    reportOnLeave                  BOOLEAN
                },
                eventA4                        SEQUENCE {
                    a4-Threshold                   ThresholdEUTRA
                },
                eventA5                        SEQUENCE {
                    a5-Threshold1                  ThresholdEUTRA,
                    a5-Threshold2                  ThresholdEUTRA
                },
                ...,
                eventA6-r10                    SEQUENCE {
                    a6-Offset-r10                  INTEGER (-30..30),
                    a6-ReportOnLeave-r10           BOOLEAN
                },
                eventC1-r12                    SEQUENCE {
                    c1-Threshold-r12               ThresholdEUTRA-v1250,
                    c1-ReportOnLeave-r12           BOOLEAN
                },
                eventC2-r12                    SEQUENCE {
                    c2-RefCSI-RS-r12               MeasCSI-RS-Id-r12,
                    c2-Offset-r12                  INTEGAR (-30..30),
                    c2-ReportOnLeave-r12           BOOLEAN
                }
                eventV1-r14                    SEQUENCE {
                    v1-Threshold-r14               SL-CBR-r14
                },
                eventV2-r14                    SEQUENCE {
                    v2-Threshold-r14               SL-CBR-r14
                }
            },
            hysteresis                     Hysteresis,
            timeToTrigger                  TimeToTrigger
        },
        periodical                     SEQUENCE {
            purpose                        ENUMERATED {
                                               reportStrongestCells, reportCGI}
        }
    },
    triggerQuantity                ENUMERATED {rsrp, rsrq},
    reportQuantity                 ENUMERATED {sameAsTriggerQuantity, both},
    maxReportCells                 INTEGER (1..maxCellReport),
    reportInterval                 ReportInterval,
    reportAmount                   ENUMERATED (r1, r2, r4, r8, r16, r32, r64,
infinity),
    ...,
    [[ si-RequestForHO-r9          ENUMERATED (setup)      OPTIONAL,   -- Cond
reportCGI
       ue-RxTxTimeDiffPeriodical-r9   ENUMERATED (setup)   OPTIONAL    -- Need
OR
    ]],
    [[ includeLocationInfo-r10     ENUMERATED {true}       OPTIONAL,   -- Need
OR
       reportAddNeighMeas-r10      ENUMERATED {setup}      OPTIONAL    -- Need
OR
    ]],
    [[ alternativeTimeToTrigger-r12   CHOICE {
           release                        NULL,
           setup                          TimeToTrigger
```

TABLE 2-continued

```
        }                                                    OPTIONAL,    -- Need ON
        useT312-r12                    BOOLEAN               OPTIONAL,    -- Need ON
        usePSCell-r12                  BOOLEAN               OPTIONAL,    -- Need ON
        aN-Threshold1-v1250            RSRQ-RangeConfig-r12                OPTIONAL,   --
Need ON
        a5-Threshold2-v1250            RSRQ-RangeConfig-r12                OPTIONAL,   --
Need ON
        reportStrongestCSI-RSs-r12     BOOLEAN               OPTIONAL,    -- Need ON
        reportCRS-Meas-r12             BOOLEAN               OPTIONAL,    -- Need ON
        triggerQuantityCSI-RS-r12      BOOLEAN               OPTIONAL      -- Need ON
    ]],
    [[ reportSSTD-Meas-r13             BOOLEAN               OPTIONAL,    -- Need ON
        rs-sinr-Config-r13             CHOICE {
            release                        NULL,
            setup                          SEQUENCE {
                triggerQuantity-v1310          ENUMERATED {sinr}     OPTIONAL,
-- Need ON
                aN-Threshold1-r13              RS-SINR-Range-r13     OPTIONAL,
-- Need ON
                a5-Threshold2-r13              RS-SINR-Range-r13     OPTIONAL,
-- Need ON
                reportQuantity-v1310           ENUMERATED {rsrpANDsinr,
rsrqANDsinr, all}
            }
        }                                                    OPTIONAL,    --
Need ON
        useWhiteCellList-r13           BOOLEAN               OPTIONAL,    --
Need ON
        measRSSI-ReportContfig-r13     MeasRSSI-ReportConfig-r13           OPTIONAL,   --
Need ON
        includeMultiBandInfo-r13       ENUMERATED {true}     OPTIONAL,    --
Cond reportCGI
        ul-DelayConfig-r13             UL-DelayConfig-r13    OPTIONAL     --
Need ON
    ]],
    [[ ue-RxTxTimeDiffPeriodicalTDD-r13  BOOLEAN             OPTIONAL     --
Need ON
    ]],
    [[
        purpose-v1430                  ENUMERATED {reportLocation, sidelink, spare2,
spare1}
                                                             OPTIONAL    -- Need ON
    ]]
}
RSRQ-RangeConfig-r12 ::=               CHOICE {
    release                                NULL,
    setup                                  RSRQ-Range-v1250
}
ThresholdEUTRA ::=                     CHOICE{
    threshold-RSRP                         RSRP-Range,
    threshold-RSRQ                         RSRQ-Range
}
TheresholdEUTRA-V1250 ::=              CSI-RSRP-Range-r12
MeasRSSI-ReportConfig-r13 ::=    SEQUENCE {
    channelOccupancyThreshold-r13          RSSI-Range-r13                  OPTIONAL   --
Need OR
}
-- ASN1STOP
```

In the example of table 2, the ReportConfigEUTRA IE may include an event A3 exit condition (a3-OffsetLeave) in the eventId IE/field, where the a3-OffsetLeave element is to include an integer value. Where multiple event-based exit conditions are to be set/configured for individual cells or beams, the ReportConfigEUTRA IE may include multiple OffsetLeave elements in one or more of the listed eventId fields (for example, event1, eventA2, eventA3, and so forth), each of which may include their own values that are independent of the other OffsetLeave elements Additionally, each eventId field may include multiple OffsetLeave elements. In some embodiments, the hysteresis element/value (hysteresis) may be used to indicate the event-based exit condition, or a new hysteresis element/value may be added to each eventId that is to include an exit condition.

Figure 1E:
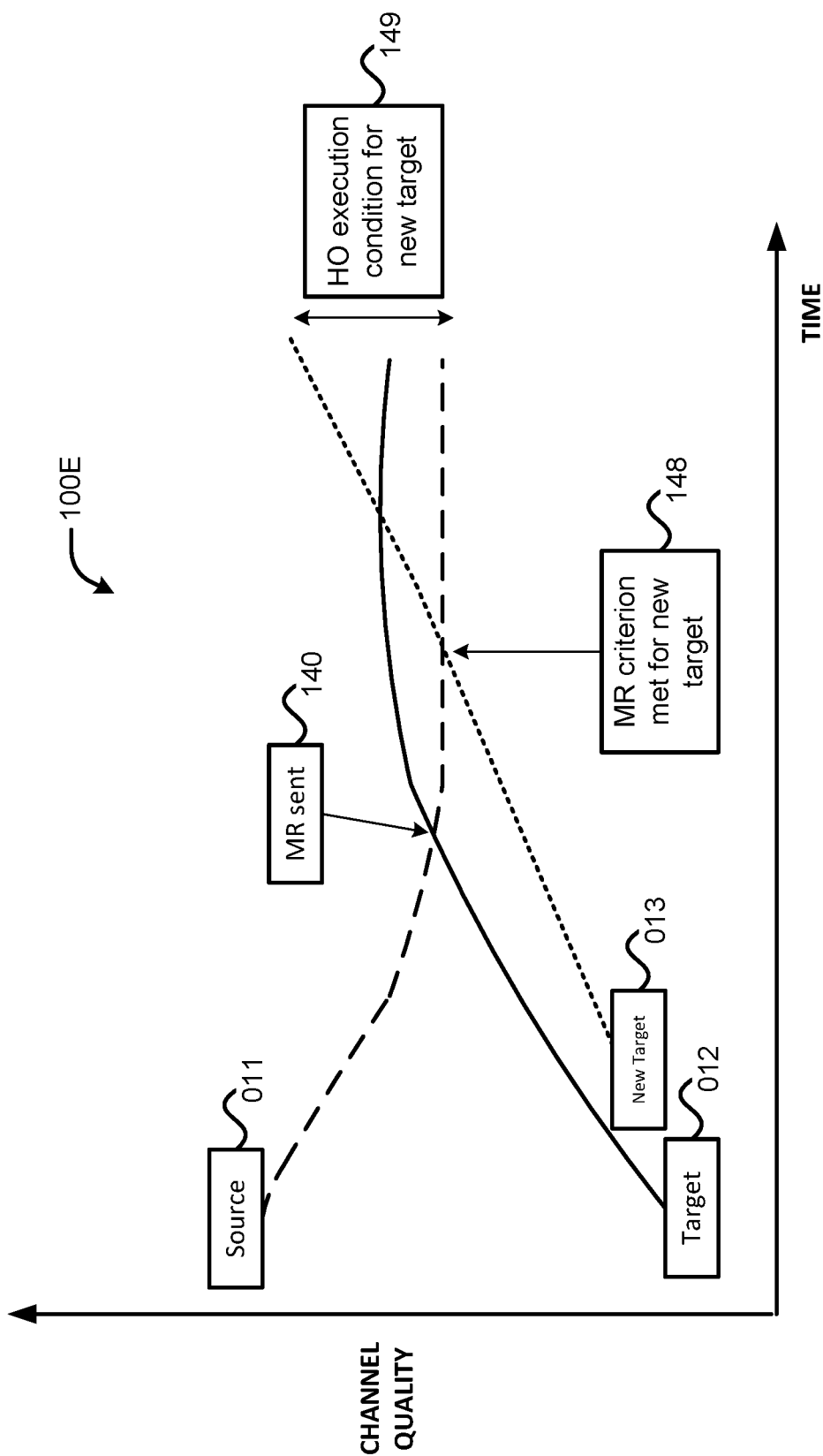

FIG. 1E shows a channel quality graph 100E for a scenario where another target cell or beam 013 (also referred to as "new target 013") is detected by the UE 101/102, in accordance with various embodiments. In these embodiments, the UE 101/102 may be monitoring multiple cells/beams at a given time, and one of these cells/beams may evolve to have a better cell/beam signal strength/quality in comparison to an originally desired target 012. This may occur while the UE 101/102 is evaluating the CHO execution condition for performing an HO to the target 012 indicated by the CHO command. In these embodiments, the UE 101/102 may send the MR at node 140 as discussed previously, and the UE 101/102 may determine that the signal strength/quality of the new target 013 meets the MR criterion for executing the CHO operation at node 148. At node 149, the UE 101/102 may determine that the CHO condition is met for the new target 013. Since this signifies that the new target 013 is a potentially better cell or beam to which the UE 101/102 should switch, the UE 101/102 may discard the CHO command for the old target 012, send a new MR for the new target cell, and wait for the network (e.g., source RAN node 111, 112) to send a new/updated HO (or CHO) command for the new target 013. This is shown by graph 100E, where the new target 013 improves in quality while the CHO execution condition to target 012 is never met. Such embodiments may require some network coordination but could help avoid unnecessary intermediate HOs, which may occur if the UE 101/102 switches to target 012 and then subsequently repeats the whole HO procedure to switch to new target 013.

In addition to the scenarios discussed with regard to FIGS. 1C-1E, in various embodiments, some or all of the conditions may be released when the UE 101/102 executes the HO (or CHO). In some embodiments, some or all of the conditions may be released when one of the previously discussed conditions are triggered. In some embodiments, some or all of the conditions may be released when the UE 101/102 declares a radio link failure (RLF), for example, when timers T310 and/or T312 expire.

In some embodiments, if the CHO condition is not satisfied and one of the previously discussed exit conditions are met, the UE 101/102 may have no choice but to connect or reconnect to a source cell or beam since legacy procedures dictate that the source cell should discontinue any data transmission to the UE 101/102 once the HO command is sent to the UE 101/102. In order for the UE to connect/reconnect with the source cell/beam when the exit condition is not met, the UE 101/102 may perform one or more of a scheduling request (SR) procedure, a random access (RA) procedure, and/or an RRC Connection Reestablishment procedure. In embodiments, the UE 101/102 may perform the RA procedure with the source cell/beam if there are no valid physical uplink control channel (PUCCH) resources available. In some embodiments, the UE 101/102 may perform the RRC Connection Reestablishment procedure when the source RAN node 111/112 still has a valid UE context. Therefore, the network (e.g., source RAN node 111/112) may need provide some coordination to ensure that the source RAN node 111/112 does not discard the UE context after sending the HO (or CHO) command, at least until the source RAN node 111/112 receives an indication that the UE 101/102 has successfully handed over to target RAN node 111/112.

In embodiments, the UE 101/102 may perform the SR procedure, the RA procedure, and/or the RRC Connection Reestablishment procedure according to a predetermined or configured priority or order. In one example, the UE 101/102 may be configured to perform the RA procedure as a first or primary procedure when RA resources are allocated for the UE 101/102, and may perform the RRC Connection Reestablishment procedure as a secondary procedure when RA resources are not allocated for the UE 101/102. In another example, the UE 101/102 may be configured to perform the SR procedure as a primary procedure when PUCCH resources are available or allocated for the UE 101/102, and may perform the RA procedure and/or the RRC Connection Reestablishment procedure as secondary procedures as discussed with regard to the previous example. In yet another example, the UE 101/102 may perform the SR procedure, the RA procedure, and the RRC Connection Reestablishment procedure in order until (re)connection with the source cell/beam is (re)established.

Furthermore, in various embodiments, when the UE 101/102 successfully performs an HO to a target cell or beam, the UE 101/102 may send a notification of the successfully performed HO to the source RAN node 111/112. In such embodiments, the UE 101/102 may transmit such an indication before initiation of the HO procedure, during performance of the HO procedure, or after the HO procedure has been completed. Additionally or alternatively, the target RAN node 111/112 may send an HO completion indication to the source RAN node 111/112 (if different than the target RAN node 111/112) once the UE has completed the HO. This indication may be used by the source RAN node 111/112 to release the UE 101/102 and/or the UE context.

According to various embodiments, several options may be used to enable CHO commands. In a first option, a new event for CHO may be created. In a second option, a new field in the HO command may be created to indicate that the HO is a CHO or that CHO is enabled, and such a field may also include or indicate the CHO condition. In this option, the new field and/or the CHO condition may be included in an RRC container generated by the target RAN node 111/112. In a third option, a new field may be created in an RRCConnectionReconfiguration message sent by source RAN node 111/112 to the UE 101/12, which may also include the mobilityControlInfo IE. In this option, the RRCConnectionReconfiguration message may be generated by the source RAN node 111/112 along with the CHO condition and the exit condition.

In addition, the source RAN node 111/112 may signal the occurrence of a CHO to a target RAN node 111/112. This signaling may be done using the X2 or Xn interface where the source RAN node 111/112 is different or separate from the target RAN node 111/112, or this signaling may done using an internal interface where the source and target RAN node 111/112 is a same device or equipment (for example, using the F1 interface between a gNB-centralized unit (CU) and gNB-distributed unit (DU) in NR implementations). In some embodiments, the source RAN node 111/112 may include an indication in the HO request message to indicate that the HO is a CHO. In this way, the target RAN node 111/112 may know that the CHO may not occur immediately. Additionally, in these embodiments, the target RAN node 111/112 may accept the CHO if CHO is supported (for example, by sending an HO acknowledgement (ACK) message to the source RAN node 111/112) or the target RAN node 111/112 may reject may reject the CHO if CHO is not supported (for example, by sending an HO negative ACK (NACK) message to the source RAN node 111/112). In other embodiments, the target RAN node 111/112 may decide that a CHO can be triggered and may provide an indication of this decision to the source RAN node 111/112.

Furthermore, communication between the source and target RAN nodes 111/112 may include the source RAN node 111/112 indicating to the target RAN node 111/112 to release RACH resources when a CHO exit condition has been met and/or when the CHO has failed. The source RAN node 111/112 may send such an indication in response to receipt of a new MR from a UE 101/102 as discussed previously, or when an exit condition timer at the source RAN node 111/112 expires. In some embodiments, the source RAN node 111/112 may send the CHO condition and the CHO exit condition to the target RAN node 111/112 so that the target RAN node 111/112 may determine whether the CHO exit condition has occurred and the target RAN node 111/112 may release RACH resources when the CHO exit condition occurs. There embodiments may be used where timer-based exit conditions are used.

Moreover, in some embodiments, the UE capability information may also be altered or changed to accommodate CHOs. For example, a one (1) bit field may be added to the UE capability IE to indicate UE 101/102 support for conditional handovers. In other embodiments, CHO support may be a mandatory feature, and thus, the network elements may assume that CHO is supported by UEs 101/102 or for a particular class or type of UEs 101/102.

Referring back to FIG. 1A, the UEs 101, 102 may perform measurements for cell selection and cell reselection, as well as for handover operations. When the UEs 101, 102 are camped on a cell provided by a RAN node 111, 112, the UEs 101, 102 may regularly or periodically search for a better cell or beam according to cell reselection criteria. If a better cell or beam is found, that cell or beam may be selected, and the UEs 101, 102 may tune to that cell's control channel(s) or (the beam's anchor channel(s)) so that the UEs 101, 102 can receive system information, registration area information (for example, tracking area information), other access stratum (AS) and/or non-access stratum (NAS) information, and/or paging and notification messages (if registered), as well as transfer to connected mode (if registered).

In some embodiments, the cell selection or reselection process may be speed-dependent, where the UEs 101, 102 may be restricted to the number of reselections they may perform based on a speed or velocity at which the UEs 101, 102 are traveling. In these embodiments, the UEs 101, 102 may be capable of estimating their respective mobility states. A UE's mobility state may be used to avoid frequent cell (re)selections and HOs, and may be used to enhance other features. The UEs 101, 102 may estimate their respective mobility states by counting the number of handovers and/or cell (re)selections within a selected period of time or a time window. In this regard, the UEs 101, 102 may receive an indication or configuration from the network of the time window and count thresholds used to determine the respective mobility states. In some embodiments, mobility state estimation may be implemented by the network by tracking the prior history of handovers or (re)selections for the UEs 101, 102. The process or procedures used by the UEs 101, 102 (or the network) to estimate or determine their respective mobility states may be referred to as Mobility State Estimation (MSE).

The mobility states may include a normal mobility state, a medium mobility state, and a high mobility state. The classification of a UE's mobility state into one of the aforementioned categories may be based on mobility state parameters including $T_{CRmax}$, $N_{CR\_H}$, $N_{CR\_M}$, and $T_{CRmaxHyst}$ that are sent in the system information broadcast of a serving cell. $T_{CRmax}$ is the duration for evaluating criteria to enter mobility states (for example, the time period or time window discussed previously); $N_{CR\_H}$ is the threshold number of cell (re)selections to enter the high mobility state; $N_{CR\_M}$ is the number of cell (re)selections to enter the medium mobility state; and $T_{CRmaxHyst}$ is an additional duration (time period, time window, etc.) for evaluating criteria to enter the normal mobility state. For example, a UE 101, 102 may estimate its mobility state to be the medium mobility when the number of cell reselections during time period $T_{CRmax}$ exceeds $N_{CR\_M}$, but does not exceed $N_{CR\_H}$. In another example, a UE 101/102 may estimate its mobility state to be the high mobility state when the number of cell reselections during time period $T_{CRmax}$ exceeds $N_{CR\_H}$. The UE 101, 102 may estimate its mobility state to be the normal mobility state when the UE's mobility state is neither one of the medium or high mobility states. Additionally, the UEs 101, 102 may not count consecutive reselections between the same two cells into mobility state detection criteria if the same cell is reselected just after one other reselection.

If the UE 101, 102 detects the criteria for the high mobility state, then the UE 101, 102 may enter or transition to the high mobility state. If the UE 101, 102 detects the criteria for the medium mobility state, then the UE 101, 102 may enter or transition to the medium mobility state. Otherwise, if criteria for either the medium or the high mobility state are not detected during time period $T_{CRmaxHyst}$, then the UE 101, 102 may enter or transition to the normal mobility state. When the UEs 101, 102 operate in an NR system, the UEs 101, 102 may experience high frequency beamforming to be used, which may make MSE more challenging.

Various NR implementations may include high frequency or relatively high rates of beamforming, which may introduce complexity into the MSE procedures. This is because NR RAN nodes 111/112 may include multiple TRPs, and each of the multiple TRPs may be used to provide individual cells or to form individual beams. Therefore, NR cell sizes may be relatively large in comparison to the cell sizes provided by typical LTE RAN nodes 111/112.

According to various embodiments, an NR-capable UE 101/102 may count each cell based on a corresponding cell identifier (cell ID) when HO and/or cell reselection occurs, regardless of TRxP and/or beam switches, and may the UE 101/102 may use the cell count and a set of configured mobility state thresholds to determine whether the UE 101/102 is in a high, medium, or low mobility state. In embodiments, the UE 101/102 may also count the number of TRxP, beam, and/or cell reselections or switches, which may be used for determining the UE mobility state.

In a first example, all NR cells in a given region or network may have the same cell size, regardless of the number of TRxPs per cell. In this example, the UE 101/102 may determine the UE mobility state based on the HO/reselection count and the configured mobility state thresholds, determine the UE mobility state based on the beam and/or TRxP switch count and the configured mobility state thresholds, or a combination thereof.

In a second example, various NR cells in a given region or network may have the different cell sizes. In this example, the UE 101/102 may determine the UE mobility state in a same or similar manner as in the first example. Additionally or alternatively, the UE 101/102 may use the cell count, beam switch count, and/or TRxP switch count to estimate a cell size of a current serving cell, and use the estimated cell size for the previously discussed MSE procedures of the first example. In some embodiments, the network (e.g., a RAN node 111/112) may broadcast or otherwise indicate the number of TRPs for a set of cells, and the UE 101/102 may use this information to estimate the cell sizes for MSE.

In various embodiments, the UE 101/102 may also be configured with a scaling factor for a beam switch count, and may determine a weighted sum using the scaling factor. In these embodiments, a weighted cell count may be based on the number of TRP and/or beam switches within an individual cell, and the scaling factor may be used to take beam/TRP switching into account to a cell size. For example, table 3 shows an example UE 101/102 count information indicating a number of beam switches and TRP switches for individual cells.

TABLE 3

| Cell ID | Number of Beam Switches | Number of TRP Switches |
|---|---|---|
| 1 | 10 | 3 |
| 3 | 5 | 5 |
| 5 | 100 | 10 |

TABLE 3-continued

| Cell ID | Number of Beam Switches | Number of TRP Switches |
|---|---|---|
| 10 | 20 | 2 |
| 5 | 80 | 8 |

In table 3, the individual cells may be identified by the Cell ID field. From the example of table 3, cell 5 may have a larger cell size than cell 3 or the UE 101/102 may have moved along the cell edge of cell 3. According to the previously discussed embodiments, the UE 101/102 may add the number of beam switches and the number of TRP switches, and may compare this sum with the configured mobility state threshold(s). However, using the aforementioned scaling factor may provide a more accurate MSE since, for example, the UE 101/102 may be blocked in a single cell that causes the UE 101/102 to perform a relatively large amount of beam/TRP switches while the UE 101/102 is in the low mobility state.

In some embodiments, the network (e.g., a RAN node 111/112) may signal one or more tuples, attribute-value pairs (AVPs), or other like data structures to indicate individual scaling factor and threshold associations only for beam switches of an individual cell. For example, the network can signal a tuples in the form of (S, T) where the first number S in the tuple may be the scaling factor and the second number T in the tuple may be a corresponding threshold. In these embodiments, the UE 101/102 may apply the weighted sum using this information. For example, the network may signal the following tuples for cell 5 in table 3: (0.5,10), (0.3,20), (0.1,50); and the weighted sum may be calculated as follows: 10*0.5+20*0.3+50*0.1=5+6+5=17. In this example, the UE 101/102 may use the configured threshold to determine the MSE. In some embodiments, the network may signal the same or similar tuples, AVPs, etc. to be used only for TRP switches. In some embodiments, the network may signal the a first set of tuples, AVPs, etc. to be used for beam switches and a second set of tuples, AVPs, etc. to be used for TRP switches, and the UE 101/102 may perform MSE using both sets of tuples, AVPs, etc.

For connected mode, the above beam and TRP related actions/operations can be applied. However, for idle mode, it is likely the UE 101/102 will not be able to perform or know beam related information. In such cases, the UE 101/102 may know the change of highest signal values in each blocks within the L blocks, and may use the L index change as the change of beam and applying the above information. An alternative may include using the UE beams as the beam count regardless of network beams.

Referring back to FIG. 1A, the RAN nodes 111, 112 may be configured to communicate with one another via interface 113X. In embodiments where the system 100A is an LTE system, the interface 113X may be an X2 interface 113X. The X2 interface may be defined between two or more RAN nodes 111, 112 (for example, two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 101/102 from an SeNB for user data; information of PDCP PDUs that were not delivered to a UE 101/102; information about a current minimum desired buffer size at the SeNB for transmitting the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100A is a 5G or NR system, the interface 113X may be an Xn interface 113X. The Xn interface is defined between two or more RAN nodes 111, 112 (for example, two or more gNBs and the like) that connect to 5GC 120, between a RAN node 111, 112 (for example, a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101/102 in a connected mode (for example, CM-CONNECTED) including functionality to manage the UE mobility for connected mode between one or more RAN nodes 211. The mobility support may include context transfer from an old (source) serving RAN node 111, 112 to new (target) serving RAN node 111, 112; and control of user plane tunnels between old (source) serving RAN node 111, 112 to new (target) serving RAN node 111, 112. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, Core Network (CN) 120. The CN 120 may comprise a plurality of network elements 122, which are configured to offer various data and telecommunications services to customers/subscribers (for example, users of UEs 101, 102) who are connected to the CN 120 via the RAN 110. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 120 may be implemented in one physical node or separate physical nodes including components to read and execute instructions from a machine-readable or computer-readable medium (for example, a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

In embodiments, the CN 120 may be a 5G CN (referred to as "5GC 120" or the like), while in other embodiments, the CN 120 may be an Evolved Packet Core (EPC). Where CN 120 is an EPC (referred to as "EPC 120" or the like), the RAN 110 may be connected with the CN 120 via an S1 interface 113A. In embodiments, the S1 interface 113A may be split into two parts, an S1 user plane (S1-U) interface 114, which carries traffic data between the RAN nodes 111 and 112 and the serving gateway (S-GW), and the S1-mobility management entity (MME) interface 115, which is a signaling interface between the RAN nodes 111 and 112 and MMEs.

In embodiments, the EPC 120 comprises the MMEs, the S-GW, the Packet Data Network (PDN) Gateway (P-GW), and a home subscriber server (HSS). The MMEs 121 may be similar in function to the control plane of legacy Serving General Packet Radio Service (GPRS) Support Nodes (SGSN). The MMEs may perform various mobility management (MM) procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 101, 102, provide user identity confidentiality, and/or other like services to users/subscribers. Each UE 101, 102 and the MME 121 may include an MM or EMM sublayer, and an MM context may be established in the UE 101, 102 and the MME 121 when an attach procedure is successfully completed. The MM context may be a data structure or database object that stores MM-related information of the UE 101, 102.

The HSS may comprise a database for network users, including subscription-related information to support the network entities' handling of communication sessions. The EPC network 120 may comprise one or several HSSs 124, depending on the number of mobile subscribers, on the capacity of the equipment, on the organization of the network, etc. For example, the HSS can provide support for routing/roaming, authentication, authorization, naming/addressing resolution, location dependencies, etc.

The S-GW may terminate the S1 interface 113A towards the RAN 110, and routes data packets between the RAN 110 and the EPC 120. In addition, the S-GW may be a local mobility anchor point for inter-RAN node handovers and also may provide an anchor for inter-3GPP mobility. Other responsibilities may include lawful intercept, charging, and some policy enforcement. The P-GW may terminate an SGi interface toward a PDN. The P-GW may route data packets between the EPC network 123 and e2ernal networks such as a network including the application server 130 (alternatively referred to as application function (AF)) via an Internet Protocol (IP) interface 125. Generally, the application server 130 may be an element offering applications that use IP bearer resources with the core network (for example, UMTS Packet Services (PS) domain, LTE PS data services, etc.). In this embodiment, the P-GW is shown to be communicatively coupled to an application server 130 via an IP communications interface 125. The application server 130 can also be configured to support one or more communication services (for example, Voice-over-Internet Protocol (VoIP) sessions, PTT sessions, group communication sessions, social networking services, etc.) for the UEs 101 and 102 via the EPC 120.

The P-GW may further be a node for policy enforcement and charging data collection. Policy and Charging Enforcement Function (PCRF) is the policy and charging control element of the EPC 120. In a non-roaming scenario, there may be a single PCRF in the Home Public Land Mobile Network (HPLMN) associated with an RE's Internet Protocol Connectivity Access Network (IP-CAN) session. In a roaming scenario with local breakout of traffic, there may be two PCRFs associated with an RE's IP-CAN session, a Home PCRF (H-PCRF) within a HPLMN and a Visited PCRF (V-PCRF) within a Visited Public Land Mobile Network (VPLMN). The PCRF may be communicatively coupled to the application server 130 via the P-GW. The application server 130 may signal the PCRF to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Where CN 120 is a 5GC (referred to as "5GC 120" or the like), the RAN 110 may be connected with the CN 120 via an NG interface 113A. In embodiments, the NG interface 113A may be split into two parts, an NG user plane (NG-U) interface 114, which carries traffic data between the RAN nodes 111 and 112 and a user plane function (UPF), and the S1 control plane (NG-C) interface 115, which is a signaling interface between the RAN nodes 111 and 112 and Access and Mobility Functions (AMFs). Embodiments where the CN 120 is a 5GC 120 are discussed in more detail with regard to FIG. 2.

Figure 2:
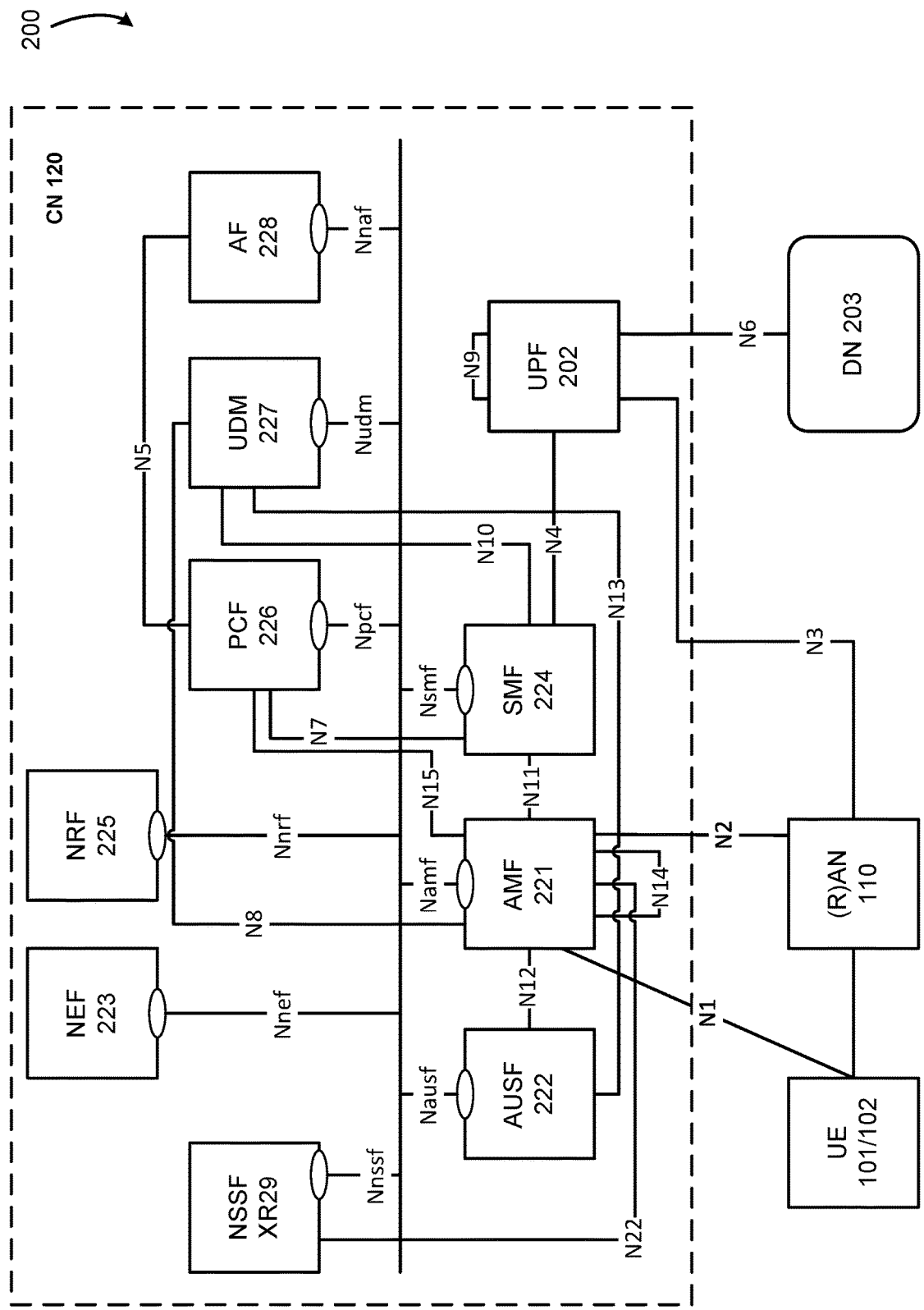
FIG. 2 illustrates another example system architecture of a network, in accordance with various embodiments

FIG. 2 illustrates an architecture of a system 200 of a 5G network in accordance with some embodiments. The system 200 is shown to include a UEs 101 and 102 (collectively referred to as "UEs 101/102" or "UE 101/102") discussed previously; a RAN 110 discussed previously, and which may include RAN nodes 111 and 112 discussed previously; and a Data network (DN) 203, which may be, for example, operator services, Internet access or 3rd party services; and a 5G Core Network (5GC or CN) 120.

In addition to being capable of performing handovers and MSE as discussed previously, the 5GC-capable UEs 101, 102 may also perform beam management operations/procedures. In NR implementations, beam management may refer to a set of layer 1 (L1) and/or layer 2 (L2) procedures to acquire and maintain a set of transmission/reception point (TRP or TRxP) and/or UE beams that can be used for downlink (DL) and uplink (UL) transmission and/or reception, which may include beam determination, which may refer to TRxP(s) or UE ability to select of its own transmission (Tx)/reception (Rx) beam(s); beam measurement, which may refer to TRxPs or UE ability to measure characteristics of received beamformed signals; beam reporting, which may refer the UE ability to report information of beamformed signal(s) based on beam measurement; and beam sweeping, which may refer to operation(s) of covering a spatial area, with beams transmitted and/or received during a time interval in a predetermined manner.

Tx/Rx beam correspondence at a TRxP holds if at least one of the following conditions are satisfied: TRxP is able to determine a TRxP Rx beam for the uplink reception based on UE's downlink measurement on TRxP's one or more Tx beams; and TRxP is able to determine a TRxP Tx beam for the downlink transmission based on TRxP's uplink measurement on TRxP's one or more Rx beams. Tx/Rx beam correspondence at a UE holds if at least one of the following is satisfied: UE is able to determine a UE Tx beam for the uplink transmission based on UE's downlink measurement on UE's one or more Rx beams; UE is able to determine a UE Rx beam for the downlink reception based on TRxP's indication based on uplink measurement on UE's one or more Tx beams; and Capability indication of UE beam correspondence related information to TRxP is supported.

In some implementations, DL beam management may include procedures P-1, P-2, and P-3. Procedure P-1 may be used to enable UE measurement on different TRxP Tx beams to support selection of TRxP Tx beams/UE Rx beam(s). For beamforming at TRxP, procedure P-1 typically includes a intra/inter-TRxP Tx beam sweep from a set of different beams. For beamforming at the UE, procedure P-1 typically includes a UE Rx beam sweep from a set of different beams.

Procedure P-2 may be used to enable UE measurement on different TRxP Tx beams to possibly change inter/intra-TRxP Tx beam(s). Procedure P-2 may be a special case of procedure P-1 wherein procedure P-2 may be used for a possibly smaller set of beams for beam refinement than procedure P-1. Procedure P-3 may be used to enable UE measurement on the same TRxP Tx beam to change UE Rx beam in the case UE uses beamforming. Procedures P-1, P-2, and P-3 may be used for aperiodic beam reporting.

UE measurements based on RS for beam management (at least CSI-RS) is composed of K beams (where K is a total number of configured beams), and the UE may report measurement results of N selected Tx beams (where N may or may not be a fixed number). The procedure based on RS for mobility purpose is not precluded. Beam information that is to be reported may include measurement quantities for the N beam(s) and information indicating N DL Tx beam(s), if N<K. Other information or data may be included in or with the beam information. When a UE is configured with K'>1 non-zero power (NZP) CSI-RS resources, a UE can report N' CSI-RS Resource Indicator (CRIs).

In some NR implementations, a UE can trigger a mechanism to recover from beam failure, which may be referred to a "beam recovery", "beam failure recovery request procedure", and/or the like. A beam failure event may occur when the quality of beam pair link(s) of an associated control channel falls below a threshold, when a time-out of an associated timer occurs, or the like. The beam recovery mechanism may be triggered when beam failure occurs. The network may explicitly configure the UE with resources for UL transmission of signals for recovery purposes. Configurations of resources are supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a UE) different from PRACH. Transmission of DL signal is supported for allowing the UE to monitor the beams for identifying new potential beams.

For beam failure recovery, a beam failure should be declared if all the serving PDCCH beams fail. The beam failure recovery request procedure may be initiated when a beam failure is declared. For example, the beam failure recovery request procedure may be used for indicating to a serving gNB (or TRP) of a new SSB or CSI-RS when beam failure is detected on a serving SSB(s)/CSI-RS(s). A beam failure may be detected by the lower layers and indicated to a Media Access Control (MAC) entity of the UE.

In some implementations, beam management may include providing or not providing beam-related indications. When beam-related indication is provided, information pertaining to UE-side beamforming/receiving procedure used for CSI-RS-based measurement can be indicated through QCL to the UE. The same or different beams on the control channel and the corresponding data channel transmissions may be supported.

Downlink (DL) beam indications may be based on a Transmission Configuration Indication (TCI) state(s). The TCI state(s) may be indicated in a TCI list that is configured by radio resource control (RRC) and/or Media Access Control (MAC) Control Element (CE). In some implementations, a UE can be configured up to M TCI-States by higher layer signaling to decode PDSCH according to a detected PDCCH with downlink control information (DCI) intended for the UE and the given serving cell where M depends on the UE capability. Each configured TCI state includes one reference signal (RS) set TCI-RS-SetConfig. Each TCI-RS-SetConfig may include parameters for configuring quasi co-location relationship(s) between the RSs in the RS set and the demodulation reference signal (DM-RS) port group of the PDSCH. The RS set may include a reference to either one or two DL RSs and an associated quasi co-location type (QCL-Type) for each DL RS(s) configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and may take one or a combination of the following types: QCL-TypeA: {Doppler shift, Doppler spread, average delay, delay spread}; QCL-TypeB: {Doppler shift, Doppler spread}; QCL-TypeC: {average delay, Doppler shift}; QCL-TypeD: {Spatial Rx parameter}.

The UE may receive a selection command (e.g., in a MAC CE), which may be used to map up to 8 TCI states to the codepoints of the DCI field TCI-states. Until a UE receives higher layer configuration of TCI states and before reception of the activation command, the UE may assume that the antenna ports of one DM-RS port group of PDSCH of a serving cell are spatially quasi co-located with the SSB determined in the initial access procedure. When the number of TCI states in TCI-States is less than or equal to 8, the DCI field TCI-states directly indicates the TCI state.

A beam failure recovery request could be delivered over dedicated PRACH or Physical Uplink Control Channel (PUCCH) resources. For example, a UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If there is no configuration, the beam failure detection could be based on CSI-RS or SSB, which is spatially Quasi Co-Located (QCLed) with the PDCCH Demodulation Reference Signal (DMRS). For example, if the UE is not provided with the higher layer parameter Beam-Failure-Detection-RS-ResourceConfig, the UE may determine $\bar{q}_0$ to include SS/PBCH blocks and periodic CSI-RS configurations with same values for higher layer parameter TCI-StatesPDCCH as for control resource sets (CORESET) that the UE is configured for monitoring PDCCH.

The physical layer of a UE may assess the radio link quality according to a set $\bar{q}_0$ of resource configurations against a threshold $Q_{out,LR}$. The threshold $Q_{out,LR}$ corresponds to a default value of higher layer parameter RIM-IS-OOS-thresholdConfig and Beam-failure-candidate-beam-threshold, respectively. For the set $\bar{q}_0$, the UE may assess the radio link quality only according to periodic CSI-RS resource configurations or SS/PBCH blocks that are quasi co-located, with the DM-RS of PDCCH receptions DM-RS monitored by the UE. The UE applies the configured $Q_{in,LR}$ threshold for the periodic CSI-RS resource configurations. The UE applies the $Q_{out,LR}$ threshold for SS/PBCH blocks after scaling a SS/PBCH block transmission power with a value provided by higher layer parameter Pc_SS.

In some implementations, if a beam failure indication has been received by a MAC entity from lower layers, then the MAC entity may start a beam failure recovery timer (beamFailureRecoveryTimer) and initiate a Random Access procedure. If the beamFailureRecoveryTimer expires, then the MAC entity may indicate a beam failure recovery request failure to upper layers. If a downlink assignment or uplink grant has been received (e.g., on a PDCCH addressed for a cell radio network temporary identifier (C-RNTI)), then the MAC entity may stop and reset beamFailureRecovery-Timer and consider the beam failure recovery request procedure to be successfully completed.

Referring back to FIG. 2, the CN 120 may include an Authentication Server Function (AUSF) 222; an Access and Mobility Management Function (AMF) 221; a Session Management Function (SMF) 224; a Network Exposure Function (NEF) 223; a Policy Control function (PCF) 226; a Network Function (NF) Repository Function (NRF) 225; a Unified Data Management (UDM) 227; an Application Function (AF) 228; a User Plane Function (UPF) 202; and a Network Slice Selection Function (NSSF) 229.

The UPF 202 may act as an anchor point for intra-RAT and inter-RAT mobility, an external PDU session point of interconnect to DN 203, and a branching point to support multi-homed PDU session. The UPF 202 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (for example, SDF to QoS flow mapping), transport level packet marking in the uplink and downlink, and downlink packet buffering and downlink data notification triggering. UPF 202 may include an uplink classifier to support routing traffic flows to a data network. The DN 203 may represent various network operator services, Internet access, or third party services. NY 203 may include, or be similar to application server 130 discussed previously. The UPF 202 may interact with the SMF 224 via an N4 reference point between the SMF 224 and the UPF 202.

The AUSF 222 may store data for authentication of UE 101/102 and handle authentication related functionality. The AUSF 222 may facilitate a common authentication framework for various access types. The AUSF 222 may communicate with the AMF 221 via an N12 reference point between the AMF 221 and the AUSF 222; and may communicate with the UDM 227 via an N13 reference point between the UDM 227 and the AUSF 222. Additionally, the AUSF 222 may exhibit an Nausf service-based interface.

The AMF 221 may be responsible for registration management (for example, for registering UE 101/102, etc.), connection management, reachability management, mobility management, and lawful interception of AMF-related events, and access authentication and authorization. The AMF 221 may be a termination point for the an N11 reference point between the AMF 221 and the SMF 224. The AMF 221 may provide transport for Session Management (SM) messages between the UE 101/102 and the SMF 224, and act as a transparent proxy for routing SM messages. AMF 221 may also provide transport for short message service (SMS) messages between UE 101/102 and an SMS function (SMSF) (not shown by FIG. 2). AMF 221 may act as Security Anchor Function (SEA), which may include interaction with the AUSF 222 and the UE 101/102, receipt of an intermediate key that was established as a result of the UE 101/102 authentication process. Where USIM based authentication is used, the AMF 221 may retrieve the security material from the AUSF 222. AMF 221 may also include a Security Context Management (SCM) function, which receives a key from the SEA that it uses to derive access-network specific keys. Furthermore, AMF 221 may be a termination point of RAN CP interface, which may include or be an N2 reference point between the (R)AN 211 and the AMF 221; and the AMF 221 may be a termination point of NAS (N1) signalling, and perform NAS ciphering and integrity protection.

AMF 221 may also support NAS signalling with a UE 101/102 over an N3 interworking-function (IWF) interface. The N3IWF may be used to provide access to untrusted entities. N3IWF may be a termination point for the N2 interface between the (R)AN 211 and the AMF 221 for the control plane, and may be a termination point for the N3 reference point between the (R)AN 211 and the UPF 202 for the user plane. As such, the AMF 221 may handle N2 signalling from the SMF 224 and the AMF 221 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 101/102 and AMF 221 via an N1 reference point between the UE 101/102 and the AMF 221, and relay uplink and downlink user-plane packets between the UE 101/102 and UPF 202. The N3IWF also provides mechanisms for IPsec tunnel establishment with the UE 101/102. The AMF 221 may exhibit an Namf service-based interface, and may be a termination point for an N14 reference point between two AMFs 221 and an N17 reference point between the AMF 221 and a 5G-Equipment Identity Register (5G-EIR) (not shown by FIG. 2).

The UE 101/102 may need to register with the AMF 221 in order to receive network services. Registration Management (RM) is used to register or deregister the UE 221 with the network (for example, AMF 221), and establish a UE context in the network (for example, AMF 221). The UE 101/102 may operate in an RM-REGISTERED state or an RM-DEREGISTERED state. In the RM-DEREGISTERED state, the UE 101/102 is not registered with the network, and the UE context in AMF 221 holds no valid location or routing information for the UE 101/102 so the UE 101/102 is not reachable by the AMF 221. In the RM-REGISTERED state, the UE 101/102 is registered with the network, and the UE context in AMF 221 may hold a valid location or routing information for the UE 101/102 so the UE 101/102 is reachable by the AMF 221. In the RM-REGISTERED state, the UE 101/102 may perform mobility Registration Update procedures, perform periodic Registration Update procedure triggered by expiration of the periodic update timer (for example, to notify the network that the UE 101/102 is still active), and perform a Registration Update procedure to update UE capability information or to re-negotiate protocol parameters with the network, among others.

The AMF 221 may store one or more RM contexts for the UE 101/102, where each RM context is associated with a specific access to the network. The RM context may be a data structure, database object, etc. that indicates or stores, inter alia, a registration state per access type and the periodic update timer. The AMF 221 may also store a 5GC MM context that may be the same or similar to the (E)MM context discussed previously. In various embodiments, the AMF 221 may store a CE mode B Restriction parameter of the UE 101/102 in an associated MM context or RM context. The AMF 221 may also derive the value, when needed, from the UE's usage setting parameter {possible values: "Data Centric", "Voice Centric"} already stored in the UE context (and/or MM/RM Context).

Connection Management (CM) may be used to establish and release a signaling connection between the UE 101/102 and the AMF 221 over the N1 interface. The signaling connection is used to enable NAS signaling exchange between the UE 101/102 and the CN 120, and comprises both the AN signaling connection between the UE and the Access Network (AN) (for example, RRC connection or UE-N3IWF connection for Non-3GPP access) and the N2 connection for the UE 101/102 between the AN (for example, RAN 211) and the AMF 221. The UE 101/102 may operate in one of two CM states, CM-IDLE mode or CM-CONNECTED mode. When the UE 101/102 is operating in the CM-IDLE state/mode, the UE 101/102 may have no NAS signaling connection established with the AMF 221 over the N1 interface, and there may be (R)AN 211 signaling connection (for example, N2 and/or N3 connections) for the UE 101/102. When the UE 101/102 is operating in the CM-CONNECTED state/mode, the UE 101/102 may have an established NAS signaling connection with the AMF 221 over the N1 interface, and there may be a (R)AN 211 signaling connection (for example, N2 and/or N3 connections) for the UE 101/102. Establishment of an N2 connection between the (R)AN 211 and the AMF 221 may cause the UE 101/102 to transition from CM-IDLE mode to CM-CONNECTED mode, and the UE 101/102 may transition from the CM-CONNECTED mode to the CM-IDLE mode when N2 signaling between the (R)AN 211 and the AMF 221 is released.

The SMF 224 may be responsible for session management (for example, session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 224 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 224 may be included in the system 200, which may be between another SMF 224 in a visited network and the SMF 224 in the home network in roaming scenarios. Additionally, the SMF 224 may exhibit the Nsmf service-based interface.

The NEF 223 may provide means for securely exposing the services and capabilities provided by 3GPP network functions for third party, internal exposure/re-exposure, Application Functions (for example, AF 228), edge computing or fog computing systems, etc. In such embodiments, the NEF 223 may authenticate, authorize, and/or throttle the AFs. NEF 223 may also translate information exchanged with the AF 228 and information exchanged with internal network functions. For example, the NEF 223 may translate between an AF-Service-Identifier and an internal 5GC information. NEF 223 may also receive information from other network functions (NFs) based on exposed capabilities of other network functions. This information may be stored at the NEF 223 as structured data, or at a data storage NF using a standardized interfaces. The stored information can then be re-exposed by the NEF 223 to other NFs and AFs, and/or used for other purposes such as analytics. Additionally, the NEF 223 may exhibit an Nnef service-based interface.

The NRF 225 may support service discovery functions, receive NF Discovery Requests from NF instances, and provide the information of the discovered NF instances to the NF instances. NRF 225 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 225 may exhibit the Nnrf service-based interface.

The PCF 226 may provide policy rules to control plane function(s) to enforce them, and may also support unified policy framework to govern network behaviour. The PCF 226 may also implement a front end (FE) to access subscription information relevant for policy decisions in a UDR of the UDM 227. The PCF 226 may communicate with the AMF 221 via an N15 reference point between the PCF 226 and the AMF 221, which may include a PCF 226 in a visited network and the AMF 221 in case of roaming scenarios. The PCF 226 may communicate with the AF 228 via an N5 reference point between the PCF 226 and the AF 228; and with the SMF 224 via an N7 reference point between the PCF 226 and the SMF 224. The system 200 and/or CN 120 may also include an N24 reference point between the PCF 226 (in the home network) and a PCF 226 in a visited network. Additionally, the PCF 226 may exhibit an Npcf service-based interface.

The UDM 227 may handle subscription-related information to support the network entities' handling of communication sessions, and may store subscription data of UE 101/102. For example, subscription data may be communicated between the UDM 227 and the AMF 221 via an N8 reference point between the UDM 227 and the AMF 221 (not shown by FIG. 2). The UDM 227 may include two parts, an application FE and a User Data Repository (UDR) (the FE and UDR are not shown by FIG. 2). The UDR may store subscription data and policy data for the UDM 227 and the PCF 226, and/or structured data for exposure and application data (including Packet Flow Descriptions (PFDs) for application detection, application request information for multiple UEs 201) for the NEF 223. The Nudr service-based interface may be exhibited by the UDR 221 to allow the UDM 227, PCF 226, and NEF 223 to access a particular set of the stored data, as well as to read, update (for example, add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 224 via an N10 reference point between the UDM 227 and the SMF 224. UDM 227 may also support SMS management, wherein an SMS-FE implements the similar application logic as discussed previously. Additionally, the UDM 227 may exhibit the Nudm service-based interface.

The AF 228 may provide application influence on traffic routing, access to the Network Capability Exposure (NCE), and interact with the policy framework for policy control. The NCE may be a mechanism that allows the 5GC and AF 228 to provide information to each other via NEF 223, which may be used for edge computing implementations. In such implementations, the network operator and third party services may be hosted close to the UE 101/102 access point of attachment to achieve an efficient service delivery through the reduced end-to-end latency and load on the transport network. For edge computing implementations, the 5GC may select a UPF 202 close to the UE 101/102 and execute traffic steering from the UPF 202 to DN 203 via the N6 interface. This may be based on the UE subscription data, UE location, and information provided by the AF 228. In this way, the AF 228 may influence UPF (re)selection and traffic routing. Based on operator deployment, when AF 228 is considered to be a trusted entity, the network operator may permit AF 228 to interact directly with relevant NFs. Additionally, the AF 228 may exhibit an Naf service-based interface.

The NSSF 229 may select a set of network slice instances serving the UE 101/102. The NSSF 229 may also determine allowed Network Slice Selection Assistance Information (NSSAI) and the mapping to the Subscribed Single-NSSAIs (S-NSSAIs), if needed. The NSSF 229 may also determine the AMF set to be used to serve the UE 101/102, or a list of candidate AMF(s) 221 based on a suitable configuration and possibly by querying the NRF 225. The selection of a set of network slice instances for the UE 101/102 may be triggered by the AMF 221 with which the UE 101/102 is registered by interacting with the NSSF 229, which may lead to a change of AMF 221. The NSSF 229 may interact with the AMF 221 via an N22 reference point between AMF 221 and NSSF 229; and may communicate with another NSSF 229 in a visited network via an N31 reference point (not shown by FIG. 2). Additionally, the NSSF 229 may exhibit an Nnssf service-based interface.

As discussed previously, the CN 120 may include an SMSF, which may be responsible for SMS subscription checking and verification, and relaying SM messages to/from the UE 101/102 to/from other entities, such as an SMS-GMSC/IWMSC/SMS-router. The SMS may also interact with AMF 221 and UDM 227 for notification procedure that the UE 101/102 is available for SMS transfer (for example, set a UE not reachable flag, and notifying UDM 227 when UE 101/102 is available for SMS).

The CN 120 may also include other elements that are not shown by FIG. 2, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (for example, UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 2 for clarity. In one example, the CN 120 may include an Nx interface, which is an inter-CN interface between the MME (for example, MME 121) and the AMF 221 in order to enable interworking between CN 120 and CN 120. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

Figure 3:
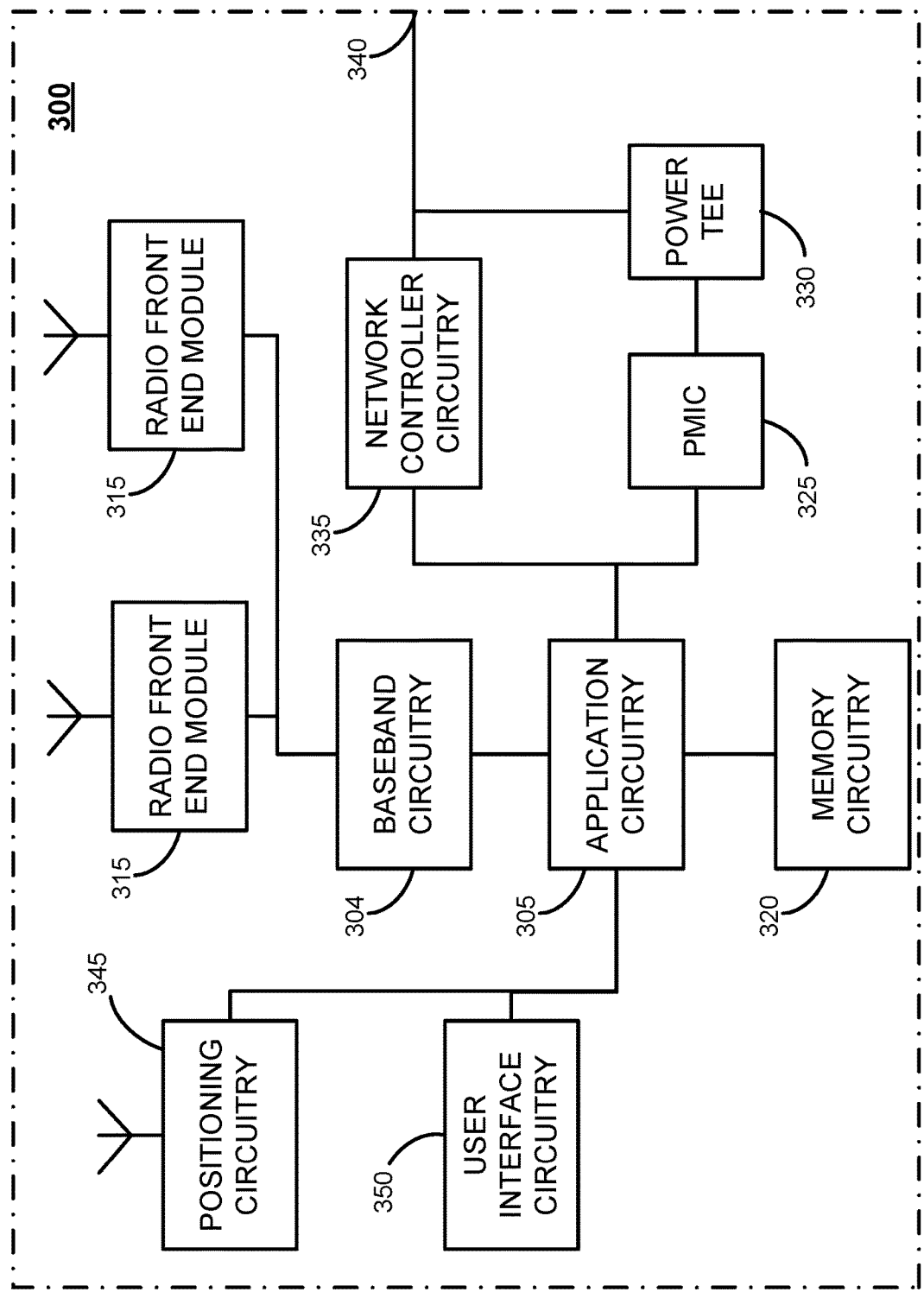
FIG. 3 depicts an example of infrastructure equipment in accordance with various embodiments.

FIG. 3 illustrates an example of infrastructure equipment 300 in accordance with various embodiments. The infrastructure equipment 300 (or "system 300") may be implemented as a base station, radio head, RAN node, etc., such as the RAN nodes 111 and 112, and/or AP 106 shown and described previously. In other examples, the system 300 could be implemented in or by a UE or a core network node/entity, such as those shown and described with regard to FIGS. 1-2. The system 300 may include one or more of application circuitry 305, baseband circuitry 304, one or more radio front end modules 315, memory 320, power management integrated circuitry (PMIC) 325, power tee circuitry 330, network controller 335, network interface connector 340, satellite positioning circuitry 345, and user interface 350. In some embodiments, the device 400 may include additional elements such as, for example, memory/storage, display, camera, sensor, or input/output (I/O) interface. In other embodiments, the components described below may be included in more than one device (for example, said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 305 may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 305 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 300 may not utilize application circuitry 305, and instead may include a special-purpose processor/controller to process IP data received from an EPC or 5GC, for example.

Additionally or alternatively, application circuitry 305 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric including and other interconnected resources that may be programmed to perform various functions, such as the procedures, methods, functions, etc. of the various embodiments discussed herein. In such embodiments, the circuitry of application circuitry 305 may include memory cells (for example, erasable programmable read-only memory (EPROM), electrically erasable programmable read-only memory (EEPROM), flash memory, static memory (for example, static random access memory (SRAM), anti-fuses, etc.) used to store logic blocks, logic fabric, data, etc. in lookup-tables (LUTs) and the like.

The baseband circuitry 304 may be implemented, for example, as a solder-down substrate including one or more integrated circuits, a single packaged integrated circuit soldered to a main circuit board or a multi-chip module containing two or more integrated circuits. Although not shown, baseband circuitry 304 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 304 may include protocol processing circuitry with one or more instances of control circuitry (not shown) to provide control functions for the digital baseband circuitry and/or radio frequency circuitry (for example, the radio front end modules 315).

User interface circuitry 350 may include one or more user interfaces designed to enable user interaction with the system 300 or peripheral component interfaces designed to enable peripheral component interaction with the system 300. User interfaces may include, but are not limited to one or more physical or virtual buttons (for example, a reset button), one or more indicators (for example, light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 315 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocol. In some implementations, the network controller circuitry 335 may include multiple controllers to provide connectivity to other networks using the same or different protocols.

The positioning circuitry 345, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (for example, Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 may comprise various hardware elements (for example, including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (for example, positioning circuitry 345 and/or positioning circuitry implemented by UEs 101, 102, or the like) to determine their GNSS position. The GNSS signals may include a pseudorandom code (for example, a sequence of ones and zeros) that is known to the GNSS receiver and a message that includes a time of transmission (ToT) of a code epoch (for example, a defined point in the pseudorandom code sequence) and the GNSS node position at the ToT. The GNSS receivers may monitor/measure the GNSS signals transmitted/broadcasted by a plurality of GNSS nodes (for example, four or more satellites) and solve various equations to determine a corresponding GNSS position (for example, a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (for example, an offset of the GNSS receiver clock relative to the GNSS node time). In some embodiments, the positioning circuitry 345 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 345 may provide data to application circuitry 305 which may include one or more of position data or time data. Application circuitry 305 may use the time data to synchronize operations with other radio base stations (for example, RAN nodes 111, 112, 211 or the like).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an $I^2C$ interface, an SPI interface, point to point interfaces, and a power bus, among others.

Figure 4:
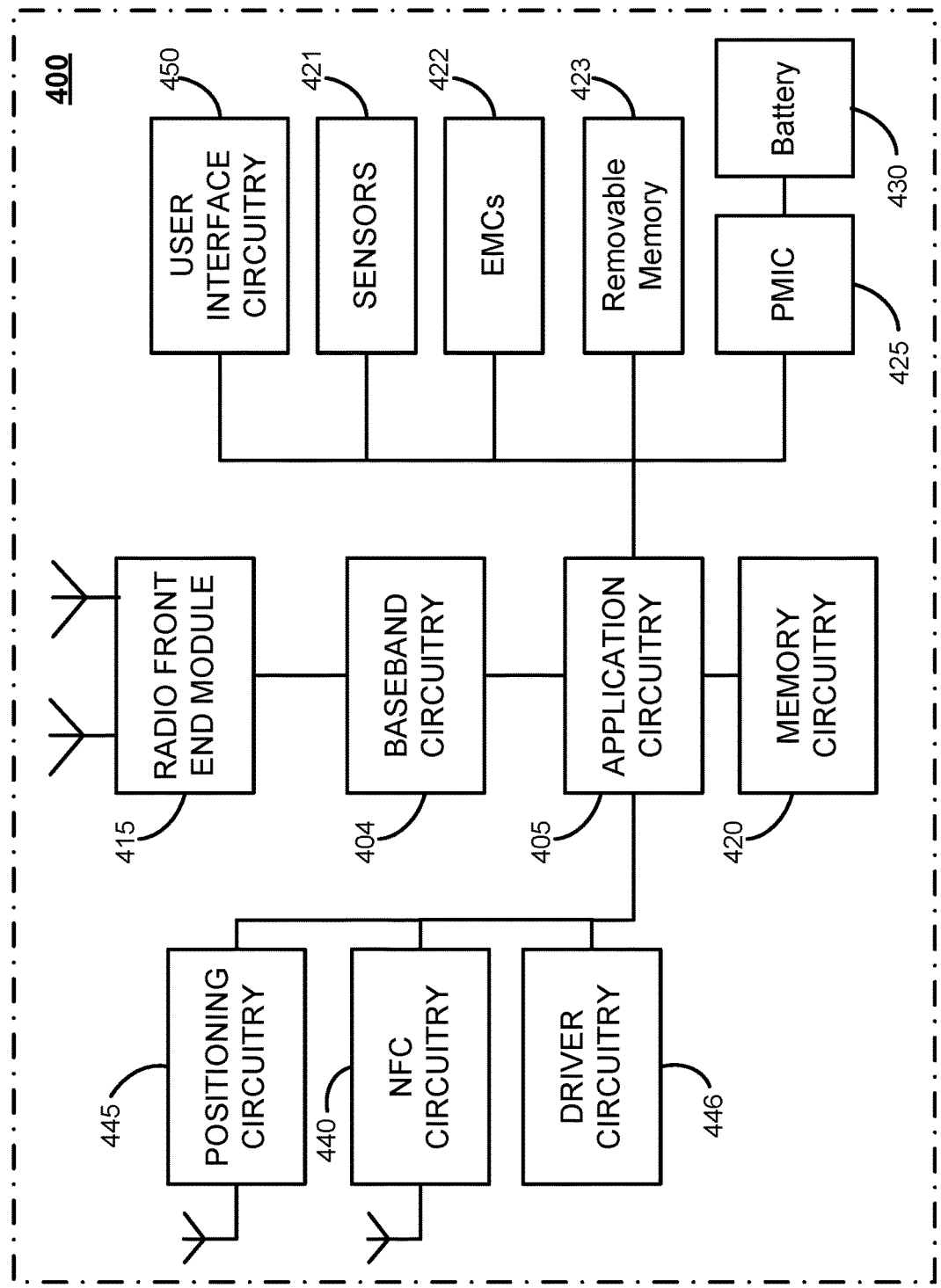
FIG. 4 depicts example components of a computer platform in accordance with various embodiments

FIG. 4 illustrates an example of a platform 400 (or "device 400") in accordance with various embodiments. In embodiments, the computer platform 400 may be suitable for use as UEs 101, 102, 201, application servers 130, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

The application circuitry 405 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (for example, graphics processors, application processors, etc.). The processors (or cores) may be coupled with or may include memory/storage and may be configured to execute instructions stored in the memory/storage to enable various applications or operating systems to run on the platform 400.

In some embodiments, processors of application circuitry 305/405 may process IP data packets received from an EPC or 5GC.

Application circuitry 405 be or include a microprocessor, a multi-core processor, a multithreaded processor, an ultra-low voltage processor, an embedded processor, or other known processing element. In one example, the application circuitry 405 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 405 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation.

Additionally or alternatively, application circuitry 405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may comprise logic blocks or logic fabric including and other interconnected resources that may be programmed to perform various functions, such as the procedures, methods, functions, etc. of the various embodiments discussed herein. In such embodiments, the circuitry of application circuitry 405 may include memory cells (for example, erasable programmable read-only memory (EPROM), electrically erasable programmable read-only memory (EEPROM), flash memory, static memory (for example, static random access memory (SRAM), anti-fuses, etc.) used to store logic blocks, logic fabric, data, etc. in lookup-tables (LUTs) and the like.

The baseband circuitry 404 may be implemented, for example, as a solder-down substrate including one or more integrated circuits, a single packaged integrated circuit soldered to a main circuit board or a multi-chip module containing two or more integrated circuits. Although not shown, baseband circuitry 404 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 404 may include protocol processing circuitry with one or more instances of control circuitry (not shown) to provide control functions for the digital baseband circuitry and/or radio frequency circuitry (for example, the radio front end modules 415).

The radio front end modules (RFEMs) 415 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include any number and type of memory devices used to provide for a given amount of system memory. As examples, the memory circuitry 420 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 420 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 420 s storage 108 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 400 may incorporate the three-dimensional (3D) cross-point (XPOINT) memories from Intel® and Micron®.

Removable memory circuitry 423 may include devices, circuitry, enclosures/housings, ports or receptacles, etc. used to coupled portable data storage devices with the platform 400. These portable data storage devices may be used for mass storage purposes, and may include, for example, flash memory cards (for example, Secure Digital (SD) cards, microSD cards, xD picture cards, and the like), and USB flash drives, optical discs, external HDDs, and the like.

The platform 400 may also include interface circuitry (not shown) that is used to connect external devices with the platform 400. The external devices connected to the platform 400 via the interface circuitry may include sensors 421, such as accelerometers, level sensors, flow sensors, temperature sensors, pressure sensors, barometric pressure sensors, and the like. The interface circuitry may be used to connect the platform 400 to electro-mechanical components (EMCs) 422, which may allow platform 400 to change its state, position, and/or orientation, or move or control a mechanism or system. The EMCs 422 may include one or more power switches, relays including electromechanical relays (EMRs) and/or solid state relays (SSRs), actuators (for example, valve actuators, etc.), an audible sound generator, a visual warning device, motors (for example, DC motors, stepper motors, etc.), wheels, thrusters, propellers, claws, clamps, hooks, and/or other like electro-mechanical components. In embodiments, platform 400 may be configured to operate one or more EMCs 422 based on one or more captured events and/or instructions or control signals received from a service provider and/or various clients.

In some implementations, the interface circuitry may connect the platform 400 with positioning circuitry 445, which may be the same or similar as the positioning circuitry 445 discussed with regard to FIG. 3.

In some implementations, the interface circuitry may connect the platform 400 with near-field communication (NFC) circuitry 440, which may include an NFC controller coupled with an antenna element and a processing device. The NFC circuitry 440 may be configured to read electronic tags and/or connect with another NFC-enabled device.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensors 421 and control and allow access to sensors 421, EMC drivers to obtain actuator positions of the EMCs 422 and/or control and allow access to the EMCs 422, a camera driver to control and allow access to an embedded image capture device, audio drivers to control and allow access to one or more audio devices.

The power management integrated circuitry (PMIC) 425 (also referred to as "power management circuitry 425" or the like) may manage power provided to various components of the platform 400. In particular, with respect to the baseband circuitry 404, the PMIC 425 may control power-source selection, voltage scaling, battery charging, or DC-to-DC conversion. The PMIC 425 may often be included when the platform 400 is capable of being powered by a battery 430, for example, when the device is included in a UE 101, 102, 201.

In some embodiments, the PMIC 425 may control, or otherwise be part of, various power saving mechanisms of the platform 400. For example, if the platform 400 is in an RRC_Connected state, where it is still connected to the RAN node as it expects to receive traffic shortly, then it may enter a state known as Discontinuous Reception Mode (DRX) after a period of inactivity. During this state, the platform 400 may power down for brief intervals of time and thus save power. If there is no data traffic activity for an extended period of time, then the platform 400 may transition off to an RRC_Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the state of health (SoH) and the state of function (SoF) of the battery 430. The BMS may communicate the information of the battery 430 to the application circuitry 405 or other components of the platform 400. The BMS may also include an analog-to-digital (ADC) convertor that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block 128 may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 400 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I$^2$C interface, an SPI interface, point to point interfaces, and a power bus, among others.

Figure 5:
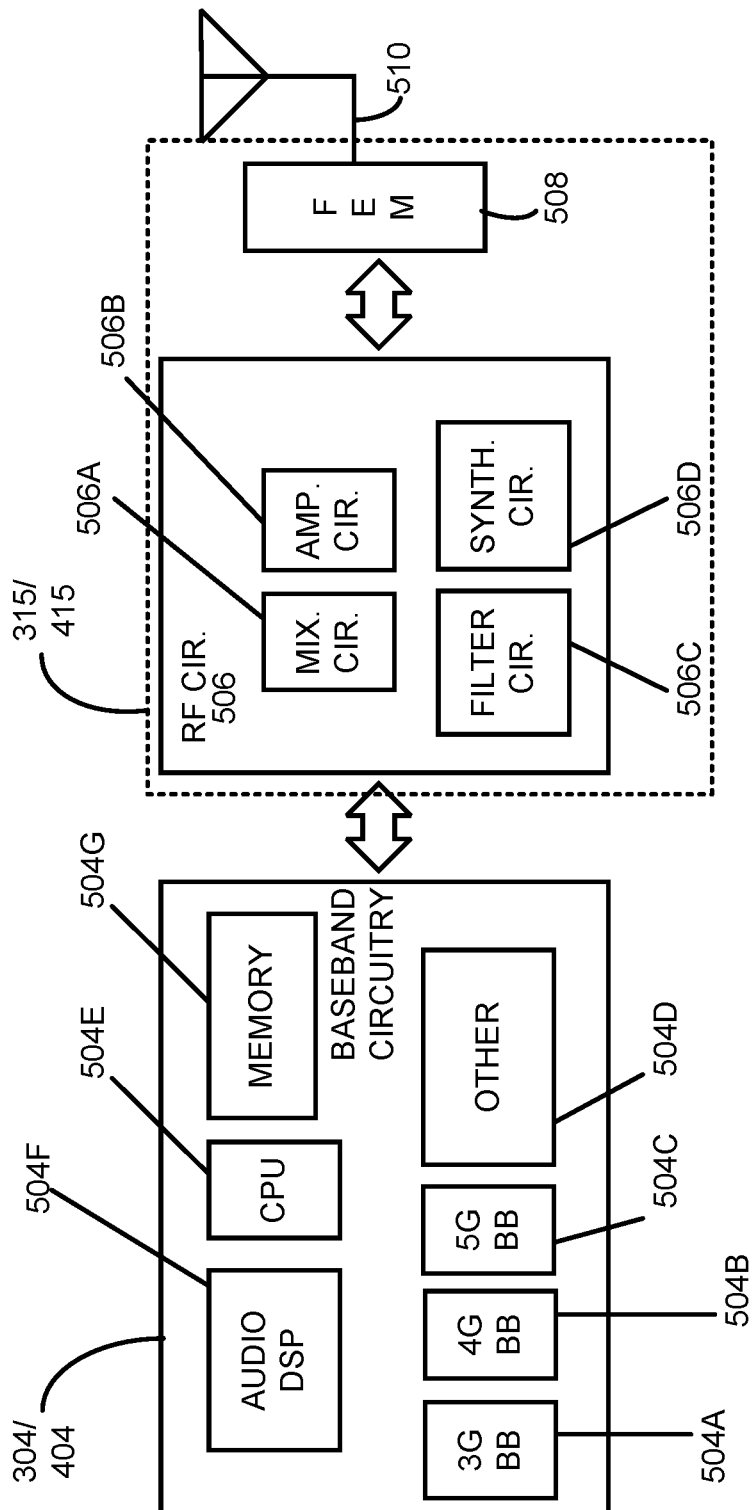
FIG. 5 depicts example components of baseband circuitry and radio frequency circuitry in accordance with various embodiments.

FIG. 5 illustrates example components of baseband circuitry 304/404 and radio front end modules (RFEM) 315/415 in accordance with some embodiments. As shown, the RFEM 315/415 may include Radio Frequency (RF) circuitry 506, front-end module (FEM) circuitry 508, one or more antennas 510 coupled together at least as shown.

The baseband circuitry 304/404 may include circuitry such as, but not limited to, one or more single-core or multi-core processors. The baseband circuitry 304/404 may include one or more baseband processors or control logic to process baseband signals received from a receive signal path of the RF circuitry 506 and to generate baseband signals for a transmit signal path of the RF circuitry 506. Baseband processing circuitry 304/404 may interface with the application circuitry 305/405 for generation and processing of the baseband signals and for controlling operations of the RF circuitry 506. For example, in some embodiments, the baseband circuitry 304/404 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (for example, second generation (2G), si5h generation (6G), etc.). The baseband circuitry 304/404 (for example, one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 304/404 may include Fast-Fourier Transform (FFT), precoding, or constellation mapping/demapping functionality. In some embodiments, encoding/decoding circuitry of the baseband circuitry 304/404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304/404 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304/404 and the application circuitry 305/405 may be implemented together such as, for example, on a system on a chip (SOC).

In some embodiments, the baseband circuitry 304/404 may provide for communication compatible with one or more radio technologies. For example, in some embodiments, the baseband circuitry 304/404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 304/404 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 304/404. RF circuitry 506 may also include a transmit signal path which may include circuitry to up-convert baseband signals provided by the baseband circuitry 304/404 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 304/404 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 304/404 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (for example, Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 304/404 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 304/404 or the applications processor 305/405 depending on the desired output frequency. In some embodiments, a divider control input (for example, N) may be determined from a look-up table based on a channel indicated by the applications processor 305/405.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (for example, based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (for example, twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (for example, to the RF circuitry 506). The transmit signal path of the FEM circuitry 508 may include a power amplifier (PA) to amplify input RF signals (for example, provided by RF circuitry 506), and one or more filters to generate RF signals for subsequent transmission (for example, by one or more of the one or more antennas 510).

Processors of the application circuitry 305/405 and processors of the baseband circuitry 304/404 may be used to execute elements of one or more instances of a protocol stack. For example, processors of the baseband circuitry 304/404, alone or in combination, may be used execute Layer 3, Layer 2, or Layer 1 functionality, while processors of the baseband circuitry 304/404 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
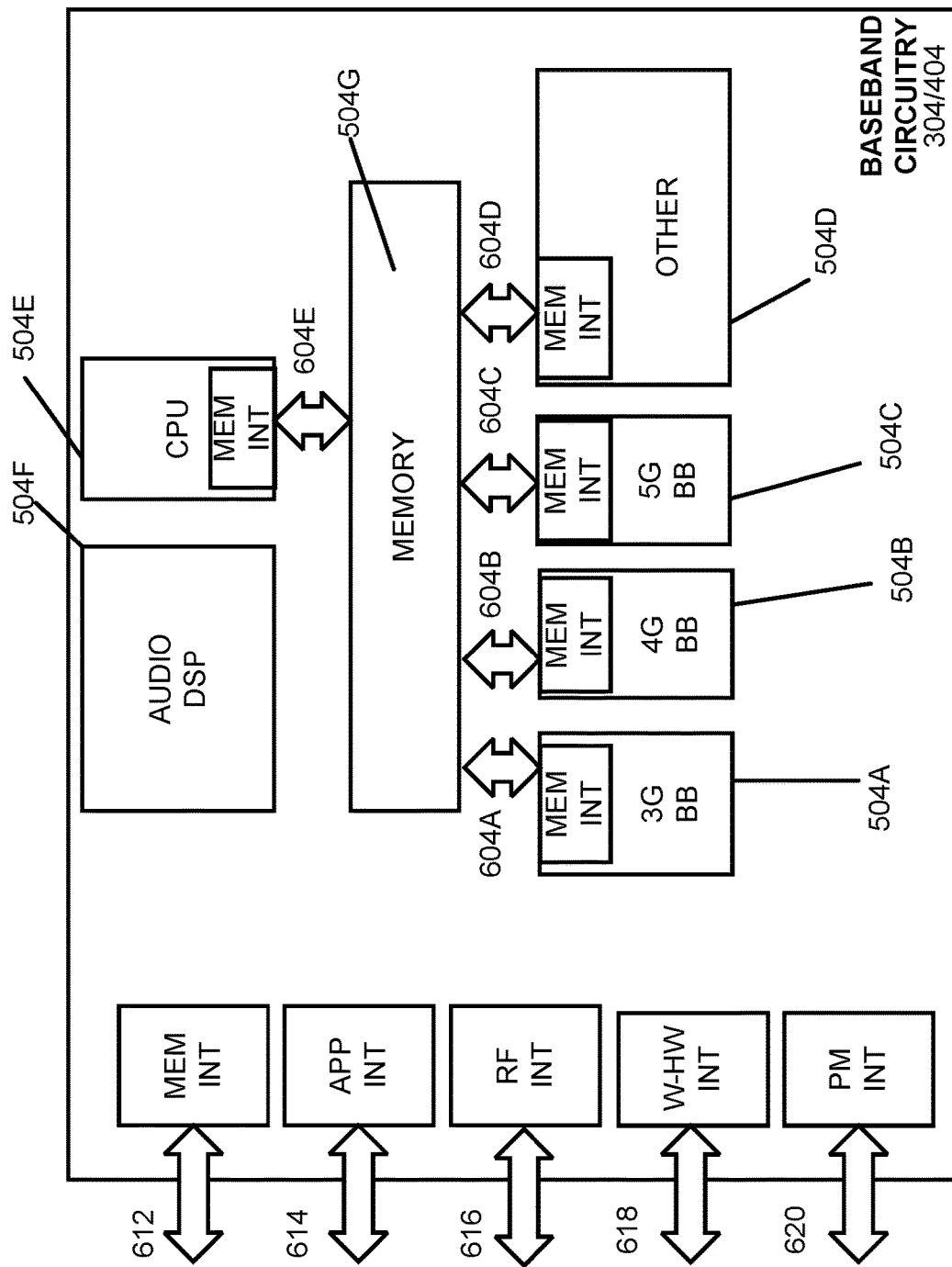
FIG. 6 depicts example interfaces of baseband circuitry in accordance with various embodiments.

FIG. 6 illustrates example interfaces of baseband circuitry in accordance with some embodiments. As discussed above, the baseband circuitry 304/404 of FIGS. 3-4 may comprise processors 504A-504E and a memory 504G utilized by said processors. Each of the processors 504A-504E may include a memory interface, 604A-604E, respectively, to send/receive data to/from the memory 504G.

The baseband circuitry 304/404 may further include one or more interfaces to communicatively couple to other circuitries/devices, such as a memory interface 612 (for example, an interface to send/receive data to/from memory external to the baseband circuitry 304/404), an application circuitry interface 614 (for example, an interface to send/receive data to/from the application circuitry 305/405 of FIGS. 3-4), an RF circuitry interface 616 (for example, an interface to send/receive data to/from RF circuitry 506 of FIG. 5), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals to/from the PMIC 425.

Figure 7:
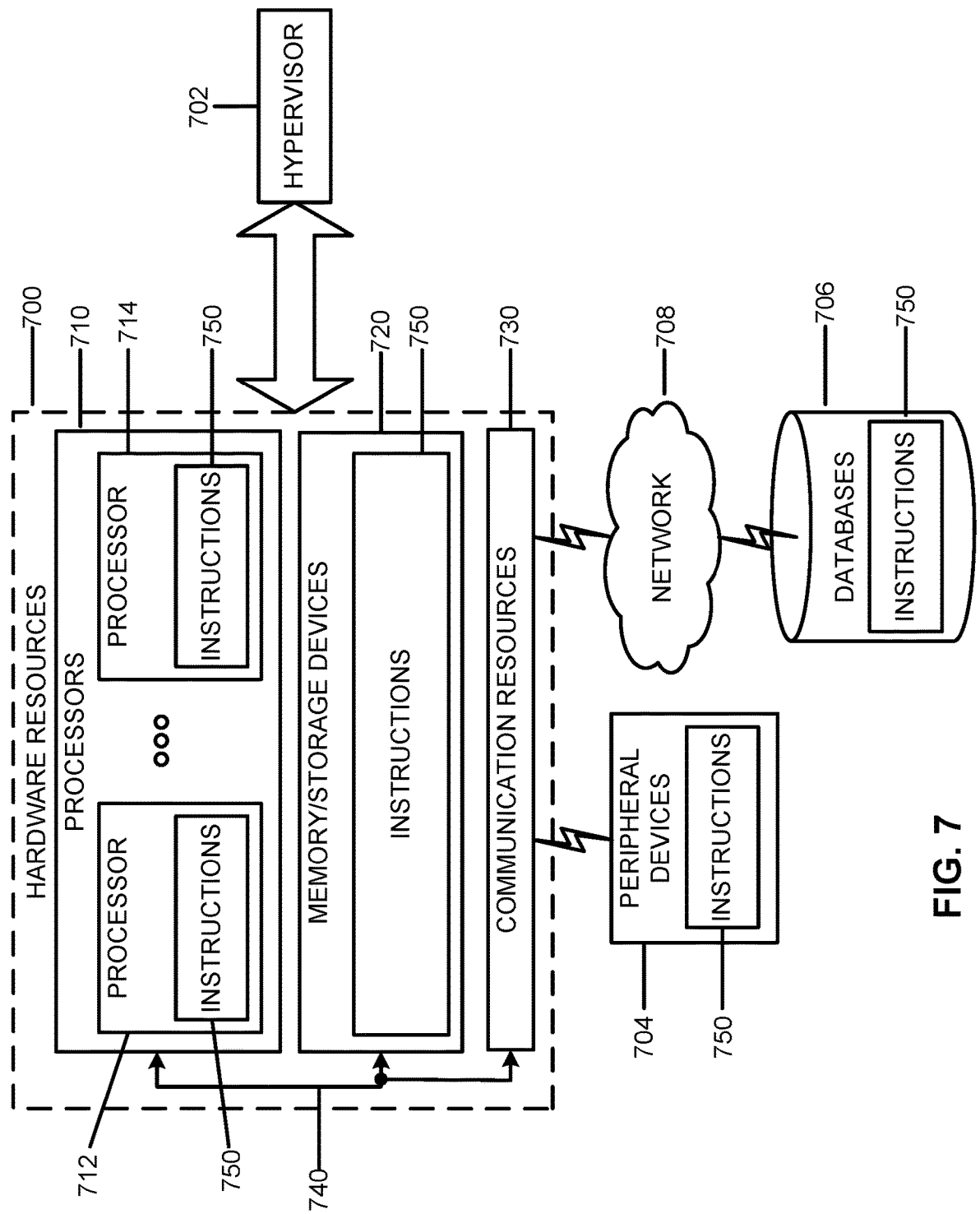
FIG. 7 depicts example components capable to perform any one or more of the methodologies discussed herein, according to various example embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (for example, NFV) is utilized, a hypervisor 702 may be executed to provide an execution environment for one or more network slices/sub-slices to utilize the hardware resources 700. A "virtualized resource" may refer to compute, storage, and/or network resources provided by virtualization infrastructure to an application, device, system, etc.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
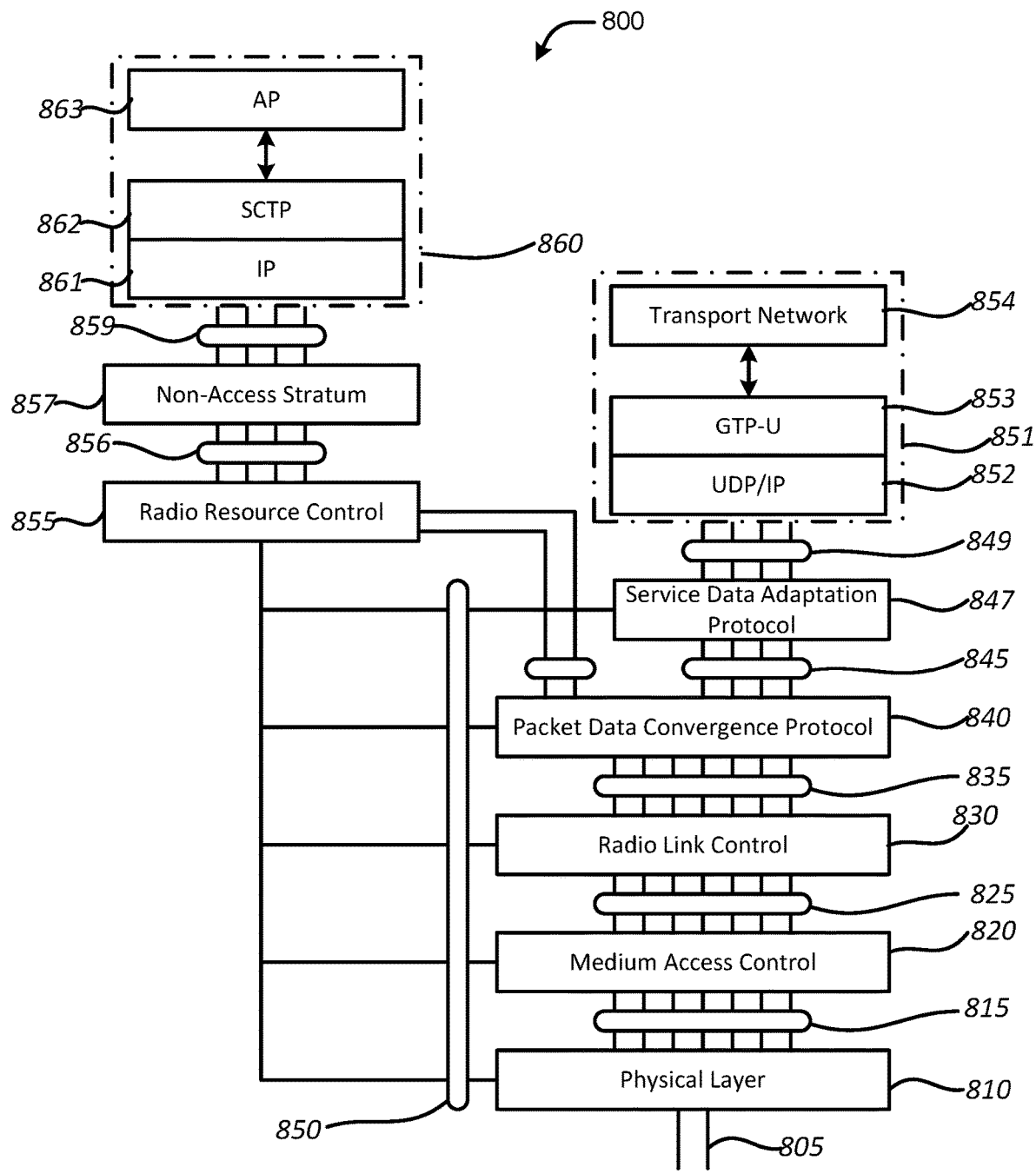
FIG. 8 is an illustration of various protocol functions in accordance with various embodiments.

FIG. 8 illustrates various protocol functions that may be implemented in a wireless communication device according to various embodiments. In particular, FIG. 8 includes an arrangement 800 showing interconnections between various protocol layers/entities. The following description of FIG. 8 is provided for various protocol layers/entities that operate in conjunction with the Fifth Generation (5G) or New Radio (NR) system standards, but some or all of these aspects of FIG. 8 may be applicable to LTE implementations as well.

The protocol layers of arrangement 800 may include one or more of a physical layer (PHY) 810, a medium access control layer (MAC) 820, a radio link control layer (RLC) 830, a packet data convergence protocol layer (PDCP) 840, a service data adaptation protocol layer (SDAP) 847, a radio resource control layer (RRC) 855, and a non-access stratum (NAS) layer 857, in addition to other higher layer functions not illustrated. The protocol layers may include one or more service access points (for example, items 859, 856, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may comprise one or more physical channels, such as those discussed herein. The PHY 810 may further perform link adaptation or adaptive modulation and coding (AMC), power control, cell search (for example, for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 810 may process requests from and provide indications to an instance of MAC 820 via one or more physical layer service access points (PHY-SAP) 815. According to some embodiments, requests and indications communicated via PHY-SAP 815 may comprise one or more transport channels.

Instance(s) of MAC 820 may process requests from, and provide indications to an instance of RLC 830 via one or more medium access control service access points (MAC-SAP) 825. These requests and indications communicated via the MAC-SAP 825 may comprise one or more logical channels. The MAC 820 may perform mapping between the logical channels and transport channels, multiplexing of MAC service data units (SDUs) from one or more logical channels onto transport blocks (TB) to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through hybrid automatic repeat request (HARQ), and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may comprise one or more RLC channels. The RLC 830 may operate in a plurality of modes of operation, including: Transparent Mode™, Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (for example, ciphering, deciphering, integrity protection, integrity verification, etc.).

Instance(s) of SDAP 847 may process requests from and provide indications to one or more higher layer protocol entities via one or more service data adaptation protocol service access points (SDAP-SAP) 849. These requests and indications communicated via SDAP-SAP 849 may comprise one or more quality of service (QoS) flows. The SDAP 847 may map QoS flows to data radio bearers (DRBs), and vice versa, and may also mark QoS flow IDs (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101/102 may monitor the QoS flow ID(s) of the DL packets for each DRB, and may apply the same mapping for packets flowing in the UL direction. For a DRB, the SDAP 847 of the UE 101/102 may map the UL packets belonging to the QoS flows(s) corresponding to the QoS flow ID(s) and PDU Session observed in the DL packets for that DRB. To enable reflective mapping, the NG-RAN may mark DL packets over the Uu interface with a QoS flow ID. The explicit mapping may involve the RRC 855 configuring the SDAP 847 with an explicit QoS flow to DRB mapping rule, which may be stored and followed by the SDAP 847.

The, RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC service access points (RRC-SAP) 856. The main services and functions of the RRC 855 may include broadcast of system information (for example, included in Master Information Blocks (MIBs) or System Information Blocks (SIBs) related to the NAS), broadcast of system information related to the access stratum (AS), paging, establishment, maintenance and release of an RRC connection between the UE 101/102 and RAN 110 (for example, RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 857 may form the highest stratum of the control plane between the UE 101/102 and the AMF 221. The NAS 857 may support the mobility of the UEs 101/102 and the session management procedures to establish and maintain IP connectivity between the UE 101 and a P-GW in LTE systems.

According to various embodiments, one or more protocol entities of arrangement 800 may be implemented in UE 101/102, RAN node 111/112, AMF 221 (or MME in LTE implementations), UPF 202 (or S-GW and P-GW in LTE implementations), or the like to be used for control plane or user plane communications protocol stack between the aforementioned devices. In such embodiments, one or more protocol entities that may be implemented in one or more of UE 101/102, gNB 111/112, AMF 221, etc. may communicate with a respective peer protocol entity that may be implemented in or on another device using the services of respective lower layer protocol entities to perform such communication. In some embodiments, a gNB-central unit (gNB-CU) of the gNB 111/112 may host the RRC 855, SDAP 847, and PDCP 840 of the gNB that controls the operation of one or more gNB-distributed units (DUs), and the gNB-DUs of the gNB 111/112 may each host the RLC 830, MAC 820, and PHY 810 of the gNB 111/112.

In a first example, a control plane protocol stack may comprise, in order from highest layer to lowest layer, NAS 857, RRC 855, PDCP 840, RLC 830, MAC 820, and PHY 810. In this example, upper layers 860 may be built on top of the NAS 857, which includes an internet protocol layer (IP) 861, an Stream Control Transmission Protocol layer (SCTP) 862, and an application layer signaling protocol (AP) 863.

In NR implementations, the AP 863 may be an NG application protocol layer (NGAP or NG-AP) 863 for the NG interface 113A defined between the NG-RAN node 111/112 and the AMF 221, or the AP 863 may be an Xn application protocol layer (XnAP or Xn-AP) 863 for the Xn interface 113X that is defined between two or more RAN nodes 111, 112.

The NG-AP 863 may support the functions of the NG interface 113A and may comprise Elementary Procedures (EPs). An NG-AP EP may be a unit of interaction between the NG-RAN node 111,112 and the AMF 221. The NG-AP 863 services may comprise two groups: UE-associated services (for example, services related to a UE 101, 102) and non-UE-associated services (for example, services related to the whole NG interface instance between the NG-RAN node 111, 112 and AMF 221). These services may include functions including, but not limited to: a paging function for the sending of paging requests to NG-RAN nodes 111, 112 involved in a particular paging area; UE Context management function for allowing the AMF 221 to establish, modify, and/or release a UE Context in the AMF 221 and the NG-RAN node 111/112; mobility function for UEs 101/102 in ECM-CONNECTED mode for intra-system HOs to support mobility within NG-RAN and inter-system HOs to support mobility from/to EPS systems; NAS Signaling Transport function for transporting or rerouting NAS messages between UE 101/102 and AMF 221; a NAS node selection function for determining an association between the AMF 221 and the UE 101/102; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes 111, 112 via CN 120; and/or other like functions.

The XnAP 863 may support the functions of the Xn interface 113X and may comprise XnAP basic mobility procedures and XnAP global procedures. The XnAP basic mobility procedures may comprise procedures used to handle UE mobility within the NG RAN 110 (or E-UTRAN 110), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101/102, such as Xn interface setup and reset procedures, NG-RAN update procedures, cell activation procedures, and the like.

In LTE implementations, the AP 863 may be an S1 Application Protocol layer (S1-AP) 863 for the S1 interface 113A defined between an E-UTRAN node 111/112 and an MME, or the AP 863 may be an X2 application protocol layer (X2AP or X2-AP) 863 for the X2 interface 113X that is defined between two or more E-UTRAN nodes 111, 112.

The S1 Application Protocol layer (S1-AP) 863 may support the functions of the S1 interface, and similar to the NG-AP discussed previously, the S1-AP may comprise S1-AP EPs. An S1-AP EP may be a unit of interaction between the E-UTRAN node 111/112 and an MME within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 113X and may comprise X2AP basic mobility procedures and X2AP global procedures. The X2AP basic mobility procedures may comprise procedures used to handle UE mobility within the E-UTRAN 110, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101/102, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (for example, NGAP or XnAP messages in NR implementations, or S1-AP or X2AP messages in LTE implementations). The SCTP 863 may ensure reliable delivery of signaling messages between the RAN node 111 and the AMF/MME based, in part, on the IP protocol, supported by the IP 861. The Internet Protocol layer (IP) 861 may be used to perform packet addressing and routing functionality. In some implementations the IP layer 861 may use point-to-point transmission to deliver convey PDUs. In this regard, the RAN node 111/112 may comprise L2 and L1 layer communication links (for example, wired or wireless) with the MME/AMF to exchange information.

In a second example, a user plane protocol stack may comprise, in order from highest layer to lowest layer, SDAP 847, PDCP 840, RLC 830, MAC 820, and PHY 810. The user plane protocol stack may be used for communication between the UE 101/102, the RAN node 111/112, and UPF 202 in NR implementations or an S-GW and P-GW in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane Protocol Data Unit layer (UP PDU) 863.

The transport network layer 854 (also referred to as a "transport layer") may be built on IP transport, and the GTP-U 851 may be used on top of the UDP/IP layer 703 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW may utilize an S1-U interface to exchange user plane data via a protocol stack comprising an L1 layer 811, an L2 layer, the UDP/IP layer 852, and the GTP-U 853. The S-GW and the P-GW may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 101/102 and the session management procedures to establish and maintain IP connectivity between the UE 101 and the P-GW.

Moreover, although not shown by FIG. 8, an application layer may be present above the AP 863 and/or the transport network layer 854. The application layer may be a layer in which a user of the UE 101/102 interacts with software applications being executed, for example, by application circuitry 305/405. The application layer may also provide one or more interfaces for software applications to interact with communications systems of the UE 101/102, such as the baseband circuitry 304/404. In some implementations the IP layer and/or the application layer may provide the same or similar functionality as layers 5-7, or portions thereof, of the Open Systems Interconnection (OSI) model (for example, OSI Layer 7—the application layer, OSI Layer 6—the presentation layer, and OSI Layer 5—the session layer).

FIGS. 9-13 illustrate processes 900-1300, respectively, for providing an updated UE Radio Capability or indicating a UE's usage setting according to various embodiments. For illustrative purposes, the operations of processes 900-1300 are described as being performed by the various devices discussed with regard to FIGS. 1-7. Some of the processes 900-1300 may include communications between various devices, and it should be understood that such communications may be facilitated by the various circuitry as described with regard to FIGS. 1-7 using the various messages/frames, protocols, entities, layers, etc. discussed with regard to FIG. 8. Moreover, while particular examples and orders of operations are illustrated in FIGS. 9-13, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Figure 9:
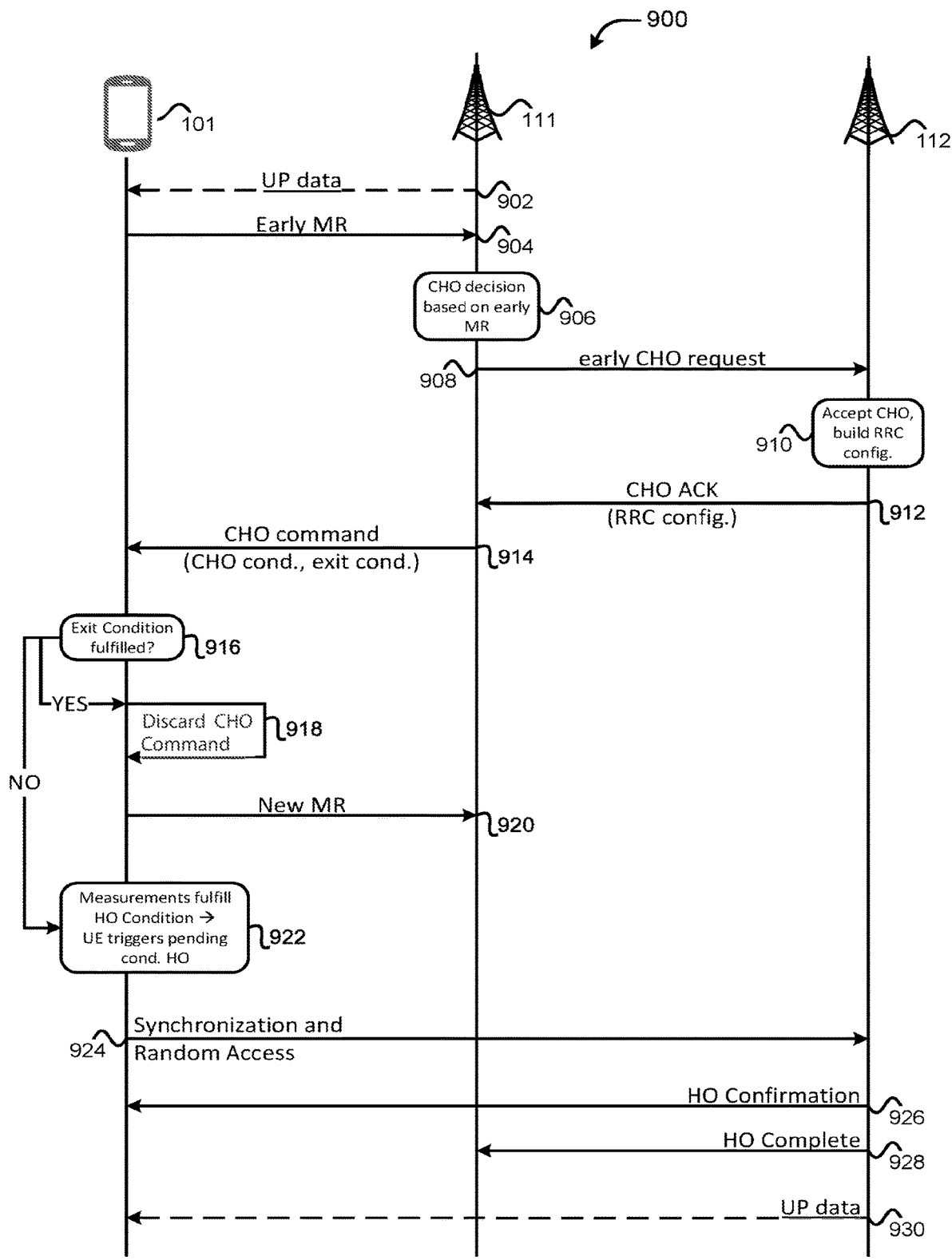
FIG. 9 shows an example conditional handover procedure in accordance with various embodiments.

FIG. 9 shows an example conditional handover procedure 900 in accordance with various embodiments. Procedure 900 depicts an example where the UE 101 may perform a condition handover (CHO) from a single serving or source RAN node 111 and a single target RAN node 112 may communicate with a UE 101; however, in many scenarios there may be many cells or beams that the UE 101 reported as possible candidates based on its preceding RRM measurements.

Procedure 900 may begin at operation 902 where the UE 101 receives user plane (UP) data from the source RAN node 111, and at operation 904, the UE 101 may transmit a measurement report (MR) to the source RAN node 111. In embodiments, the UE 101 may be configured with a "low" threshold to trigger generation and transmission of an early MR to increase the reliability of the conditional handover (CHO) command to be sent at operation 914. At operation 906, the source RAN node 111 may determine whether the UE 101 should perform an HO based on the early MR obtained at operation 904. At operation 908, the source RAN node 111 may send an early HO request to the target RAN node 112, which may include or indicate that the HO is to be a conditional HO (CHO) and may also include an exit condition for discarding the HO request. At operation 912, the target RAN node 112 may indicate acceptance of the CHO by sending a CHO acknowledgement (ACK) message to the source RAN node 111. In some embodiments, the CHO ACK message may be or may include a pre-built RRC configuration message to be sent to the UE 101.

At operation 914, the source RAN node 111 may transmit a CHO command to the UE 101, which may be included in an RRC message such as a RRC Connection Reconfiguration message. In some embodiments, the source RAN node 111 may send the pre-built RRC message obtained from the target RAN node 112 at operation 912. In various embodiments, the CHO command may include or indicate a "high" threshold condition such that when the condition is met, then the UE 101 will trigger or initiate a HO procedure with the target RAN node 112 (for example, by performing synchronization with the target RAN node 112, random access procedure, etc.). In various embodiments, the CHO command may include or indicate a CHO exit condition such that, when the exit condition is met, the UE 101 will discard the CHO command, and in some embodiments, send a new MR to the source RAN node 111.

At operation 916, the UE 101 may determine whether the exit condition has been fulfilled. If the exit condition has been fulfilled (or alternatively, the CHO condition has not been fulfilled), the UE 101 may discard the CHO command at operation 918, and in some embodiments, the UE 101 may send a new MR to the source RAN node 111 at operation 920. If the exit condition has not been fulfilled (or alternatively, the CHO condition has been fulfilled), the UE 101 may proceed to operation 922 to trigger the HO to the target RAN node 111 by performing synchronization and random access procedures with the target RAN node 112 at operation 924. At operation 926, the UE 101 may receive an HO confirmation from the target RAN node 112 and may begin receiving UP data from the target RAN node 112 at operation 930. Meanwhile, at operation 928 the target RAN node 112 may send a confirmation to the source RAN node 111 that the HO has taken place so that the source RAN node 111 may, for example, release resources that were allocated to the UE 101.

Figure 10:
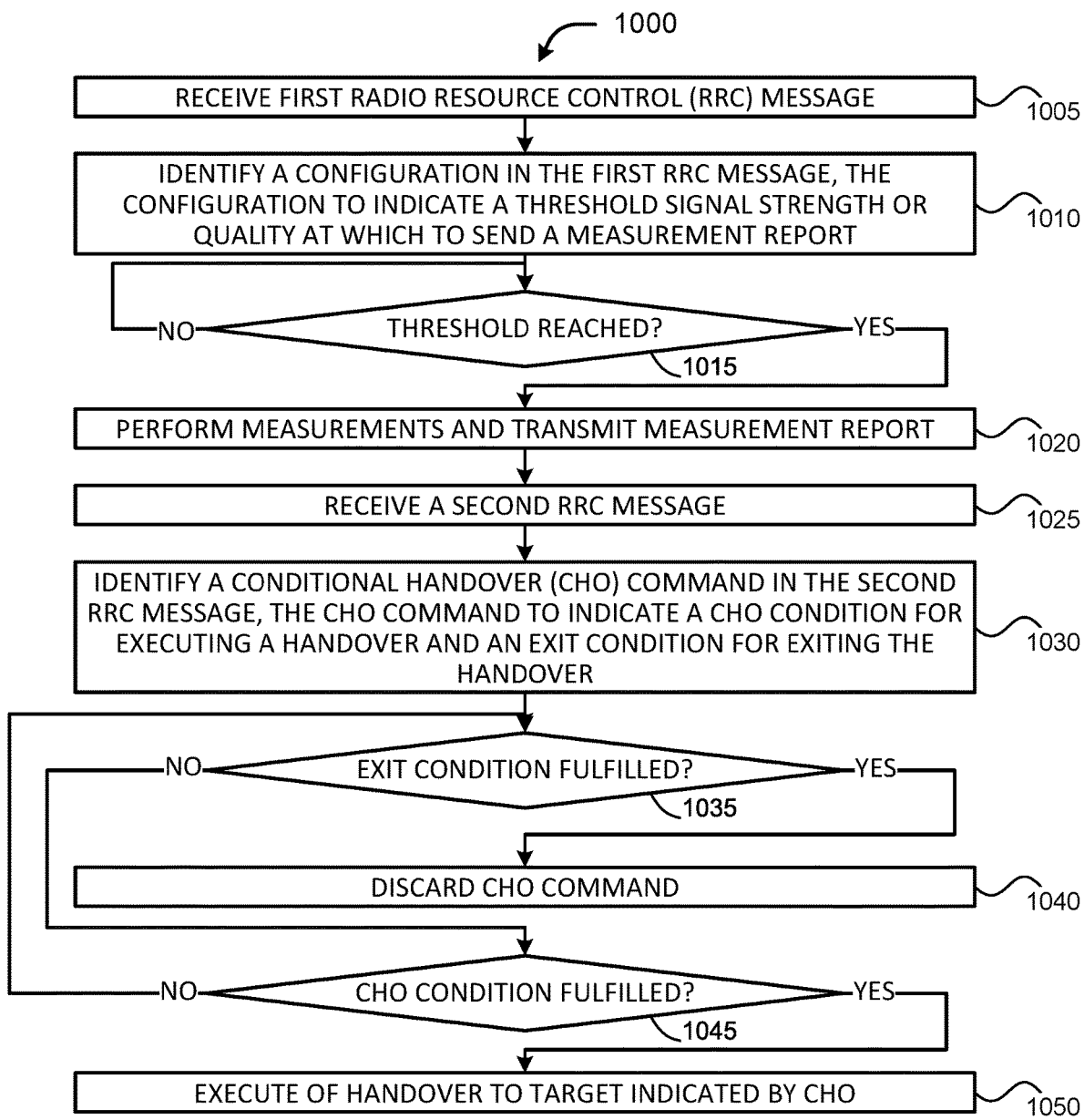
FIG. 10 shows an example conditional handover (CHO) procedure that may be performed by a user equipment, in accordance with various embodiments.

FIG. 10 shows an example conditional handover (CHO) procedure 1000 in accordance with various embodiments. By way of example, process 1000 is discussed as being performed by an UE 101 for a CHO from a source RAN node 111 to a target RAN node 112; however, other similar devices/entities may also perform process 1000.

Procedure 1000 may begin at operation 1005, where communication circuitry of the UE 101 (see for example, RFEM 415 of FIG. 4) may receive a first radio resource control (RRC) message from a source RAN node 111. At operation 1010, processor circuitry of the UE 101 (see for example, baseband circuitry 404 of FIG. 4) may identify a configuration in the first RRC message, where the configuration may indicate a threshold signal strength/quality for performing measurement reporting.

At operation 1015, the processor circuitry of the UE 101 may determine whether the threshold has been reached. If at operation 1015 the processor circuitry determines that the threshold has not been reached, the processor circuitry may loop back to estimate the signal strength/quality. If at operation 1015 the processor circuitry determines that the threshold has been reached, the processor circuitry may proceed to operation 1020 to measure and/or estimate the signal strength/quality of configured measurement objects (for example, cells or beams indicated by the configuration in the first RRC message). At operation 1020, the processor circuitry may generate a measurement report, and the communication circuitry may transmit the measurement report (MR) to the source RAN node 111.

At operation 1025, the communication circuitry of the UE 101 may receive a second RRC message, and at operation 1030 the processor circuitry of the UE 101 may identify a CHO command in the second RRC message, wherein the CHO command may indicate a CHO condition for executing a handover and an exit condition for exiting the handover. The particular CHO condition and/or exit condition included in the CHO command may be based on a determination of how long the network should reserve resources for the UE 101 in consideration of handover performance.

At operation 1035, the processor circuitry of the UE 101 may determine whether the exit condition has been fulfilled. If at operation 1035 the processor circuitry determines that the exit condition has been fulfilled, the processor circuitry may proceed to operation 1040 to discard the CHO command. If at operation 1035 the processor circuitry determines that the exit condition has not been fulfilled, the processor circuitry may proceed to operation 1045 to determine whether the CHO condition has been fulfilled. If at operation 1045, the processor circuitry of the UE 101 determines that the CHO condition has not been fulfilled, the processor circuitry may loop back to operation 1035 to determine whether the exit condition has been fulfilled. If at operation 1045 the processor circuitry determines that the CHO condition has been fulfilled, the processor circuitry may proceed to operation 1050 to execute a handover to the target RAN node 112 (or target beam) indicated by the CHO command. After performance of operation 1040 or 1050, process 900 may end or repeat as necessary.

In embodiments, after the UE 101 receives the CHO command, the UE 101 may be considered as having entered the CHO condition. After entering the CHO condition, the UE 101 may wait for a target RAN node 112 (or target beam) to satisfy the CHO condition to trigger a handover with the target RAN node 112 (or target beam). However, when the CHO condition is not fulfilled, the exit condition may be considered to be fulfilled, and the network may be able to release the resources allocated to the UE 101 for the handover.

In some embodiments, the exit condition indicated by the CHO command may be a timer based exit condition, and at operation 1035, the processor circuitry of the UE 101 may start the timer in response to receipt of the CHO command. When the timer expires before the CHO condition is fulfilled, the processor circuitry of the UE 101 may consider the exit condition to be fulfilled and may proceed to discard the CHO command at operation 1040. The specific timer value used for the exit condition may be based on a tradeoff between the time needed to resource resources for the HO and providing a sufficient amount of time so that the UE 101 may properly perform the HO in order to avoid radio link failures (RLFs).

In some embodiments, the exit condition may be event based, wherein a target cell or beam is offset lower than a serving cell or beam and/or below a threshold. This exit condition may be used by the UE 101 at operation 1035 to determine whether a handover to the target cell or beam is still desirable, and if not, then the CHO command may be discarded at operation 1040. Such embodiments may allow reserved resources to be released only when the target channel quality or signal strength is no longer optimal.

Figure 11:
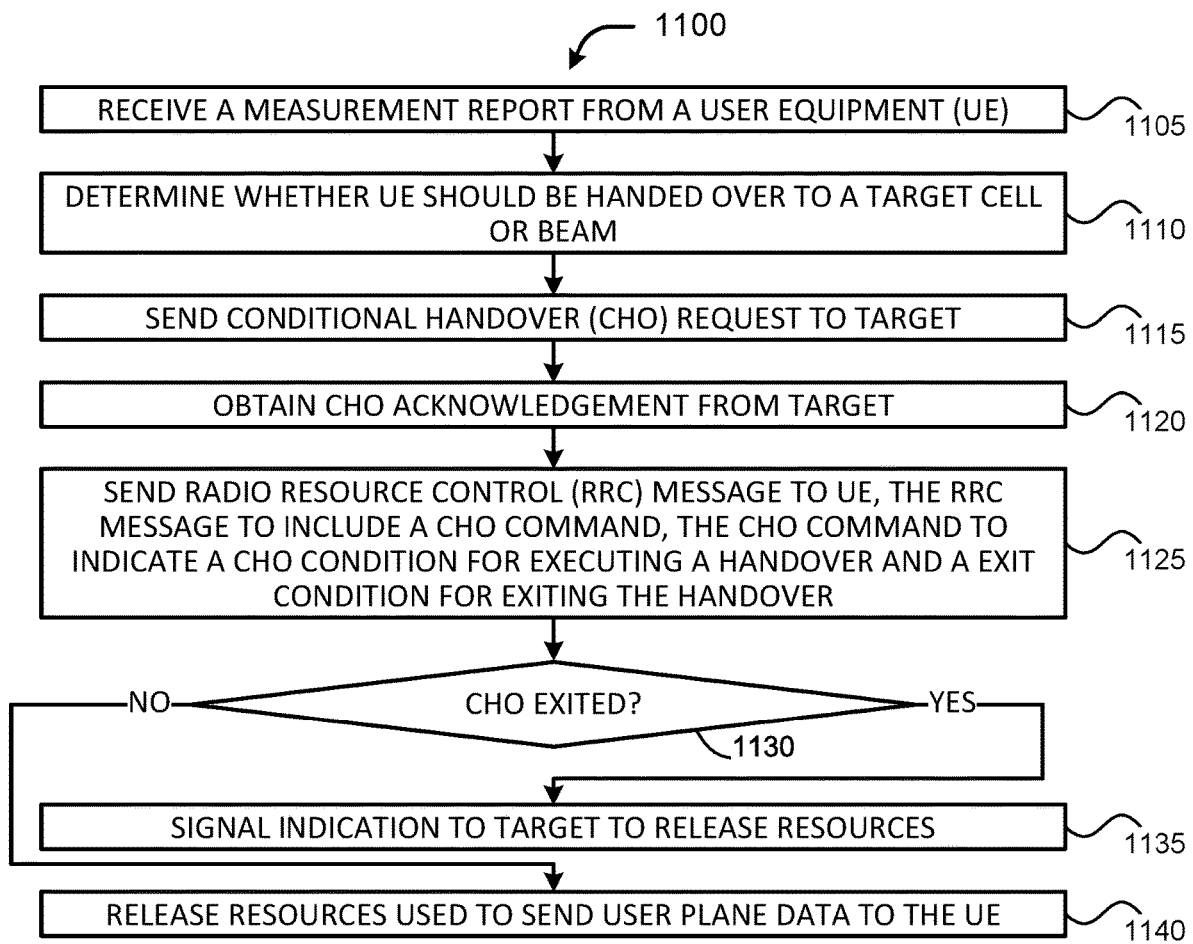
FIG. 11 shows an example CHO procedure that may be performed by a source radio access network node, in accordance with various embodiments.

FIG. 11 shows an example CHO procedure 1100 that may be performed by a source RAN node, in accordance with various embodiments. By way of example, process 1100 is discussed as being performed by RAN node 111 acting as a serving node for a CHO of a UE 101 from the source RAN node 111 to a target RAN node 112; however, other similar devices/entities may also perform process 1100.

Process 1100 may begin at operation 1105 where communication circuitry of the source RAN node 111 (see for example, RFEM 315 of FIG. 3) may receive a measurement report (MR) from a UE 101. At operation 1110, processor circuitry of the source RAN node 111 (see for example, baseband circuitry 304 or application circuitry 305 of FIG. 3) may determine whether the UE 101 should be handed over to a target RAN node 112 (or a target beam). At operation 1115, the communication circuitry of the source RAN node 111 (see for example, network controller circuitry 335 of FIG. 3) may send a CHO request to the target RAN node 112, and at operation 1120, the communication circuitry of the source RAN node 111 may obtain a CHO acknowledgement message from the target RAN node 112. In embodiments, the CHO acknowledgement message may be or may include an RRC message to be sent to the UE 101. At operation 1125, the communication circuitry of the source RAN node 111 (see for example, RFEM 315 of FIG. 3) may send the RRC message to the UE. In embodiments, the RRC message may include a CHO command to indicate a CHO condition for executing a handover with the target RAN node 112 and an exit condition for exiting the handover.

At operation 1130, the processor circuitry of the source RAN node 111 may determine whether the CHO has been exited. If at operation 1130 the processor circuitry determines that the CHO has been exited, the processor circuitry may proceed to operation 1135 to control or instruct the communication circuitry of the source RAN node 111 to signal, to the target RAN node 112, an indication to release resources that are reserved for the UE 101. If at operation 1130 the processor circuitry determines that the CHO has not been exited, the processor circuitry may proceed to operation 1140 to release the resources that have been used to send user plane data to the UE 101. In some embodiments, performance of operation 1140 may be based on receiving an indication from the UE 101 or the target RAN node 112 that the CHO has been successfully completed.

Figure 12:
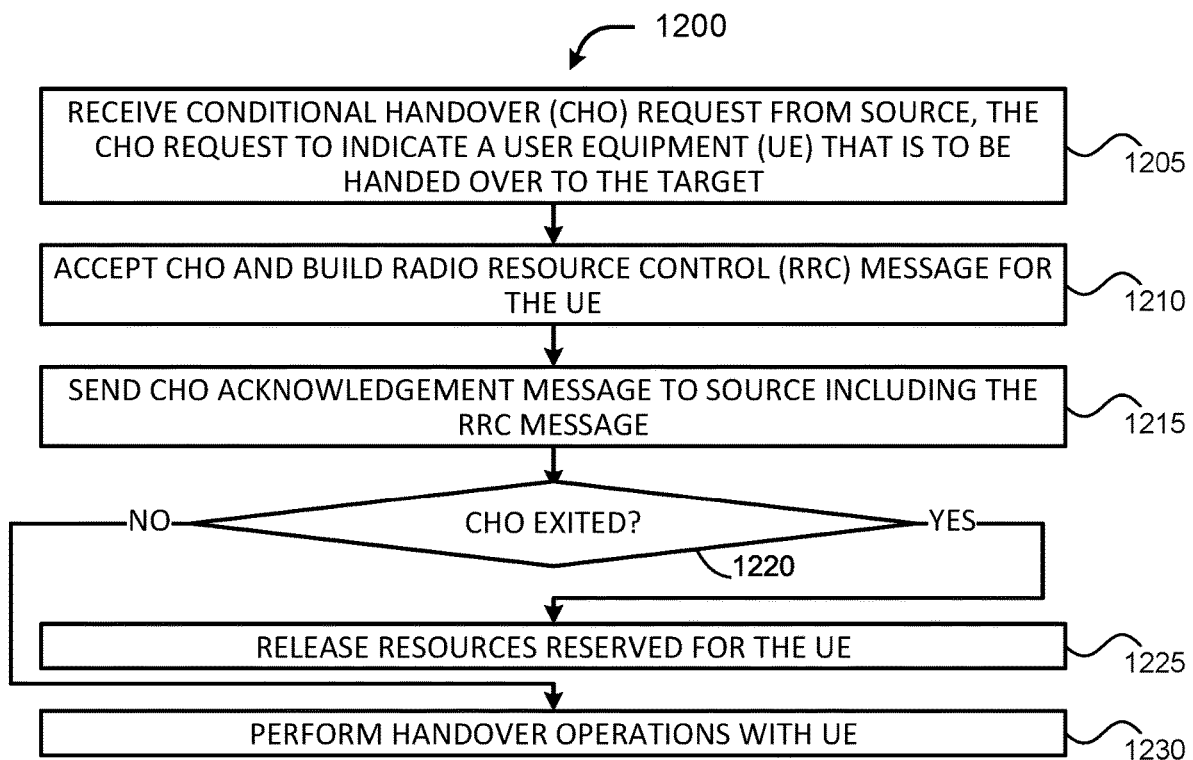
FIG. 12 shows an example CHO procedure that may be performed by a target radio access network node, in accordance with various embodiments.

FIG. 12 shows an example CHO procedure 1200 that may be performed by a target RAN node, in accordance with various embodiments. By way of example, process 1200 is discussed as being performed by RAN node 112 for a CHO of a UE 101 from a source RAN node 111 to the target RAN node 112; however, other similar devices/entities may also perform process 1200.

Process 1200 may begin at operation 1205 where communication circuitry of the target RAN node 112 (see for example, network controller circuitry 335 of FIG. 3) may receive a CHO request from the source RAN node 111 (see for example, operation 1115 of FIG. 11). In embodiments, the CHO request message may indicate a UE 101 that is to be handed over to the target RAN node 112. At operation 1210, the processor circuitry of the target RAN node 112 (see for example, baseband circuitry 304 or application circuitry 305 of FIG. 3) may build an RRC message to be sent to the UE 101 if/when the processor circuitry of the target RAN node 112 accepts the CHO request. The processor circuitry of the target RAN node 112 may accept or deny the CHO request based on whether the target RAN node 112 and/or the UE 101 support conditional handovers. Assuming that the processor circuitry of the target RAN node 112 accepts the CHO request at operation 1210, the communication circuitry of the target RAN node 112 may send a CHO acknowledgement message to the source RAN node 111 at operation 1215. In embodiments, the CHO acknowledgement message may comprise or may include the built RRC message.

At operation 1220, the processor circuitry of the target RAN node 112 may determine whether the CHO has been exited. If at operation 1220 the processor circuitry determines that the CHO has been exited, the processor circuitry may proceed to operation 1225 release resources (for example, random access channel resources) that are reserved for the UE 101. If at operation 1220 the processor circuitry determines that the CHO has not been exited, the processor circuitry may proceed to operation 1230 to perform various handover operations with the UE 101 (for example, synchronization and random access procedures). In some embodiments, after the handover is successfully completed, the communication circuitry of the target RAN node 112 may signal an indication to the source RAN node 111 that the CHO has been successfully completed.

In some embodiments, at operations 1220-1225, the source RAN node 111 may instruct the target RAN node 112 to release the target resources (for example, RACH resources) when the exit condition is fulfilled or when the CHO condition is not fulfilled. In such embodiments, the source RAN node 111 may signal this instruction to the target RAN node 112 using a suitable X2/Xn message. In some embodiments, a timer may be set by the target RAN node 112 and when the timer expires, the resource(s) may be autonomously released. The timer may be set in response to receipt of the early CHO request at operation 1145 or after the CHO acknowledgement is sent at operation 1215. In cases where the timer has expired before the UE 101 performs or initiates a handover, the source RAN node 111 may send another message to the target RAN node 112 to reserve the resource again. In other embodiments, the source RAN node 111 may explicitly signal an indication to the target RAN node 112 to release the resource(s) that are reserved for the UE 101.

Figure 13:
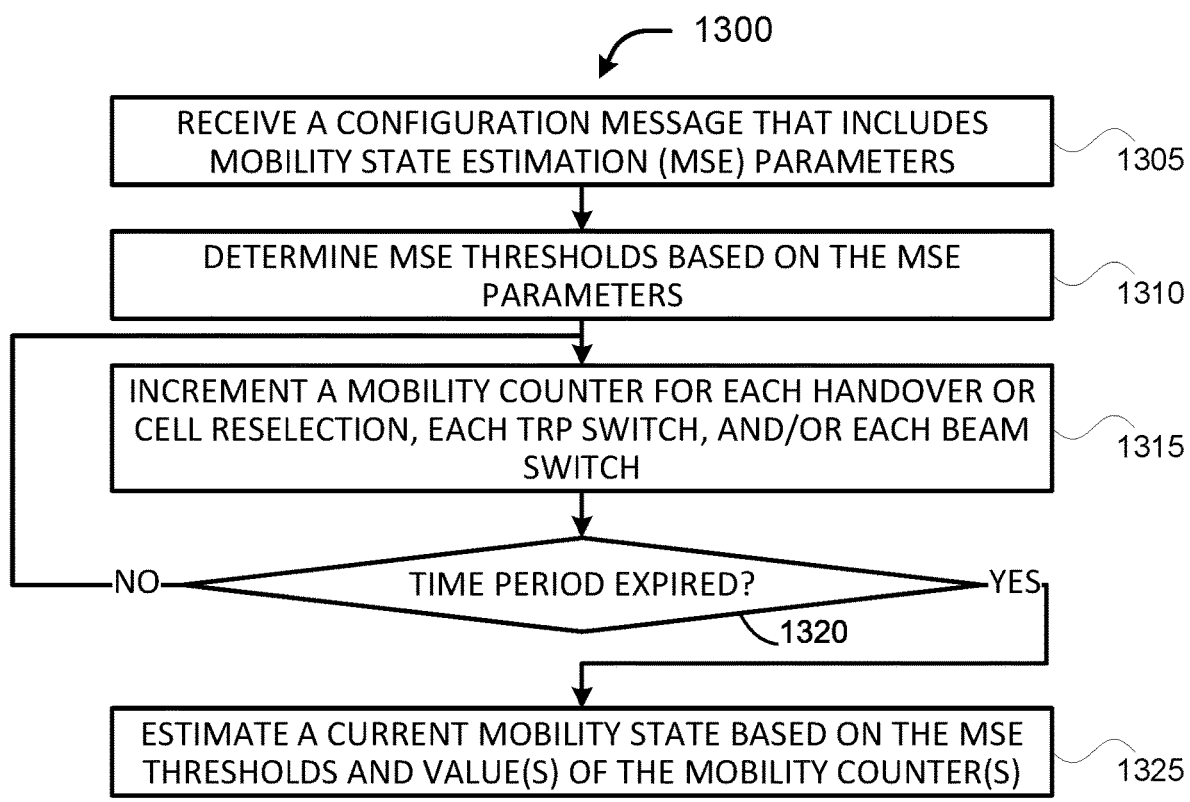
FIG. 13 shows an example mobility state estimation procedure in accordance with various embodiments.

FIG. 13 shows an example mobility state estimation (MSE) process 1300 in accordance with various embodiments. By way of example, process 1300 is discussed as being performed by an UE 101; however, other similar devices/entities may also perform process 1300.

Process 1300 may begin at operation 1305 where the communication circuitry of the UE 101 may receive a configuration message that includes mobility state estimation (MSE) parameters, and at operation 1310 the processor circuitry of the UE 101 may determine a plurality of MSE thresholds, where each of the MSE thresholds correspond with an MSE value. In some implementations, the MSE parameters may be included in system information broadcast by a serving RAN node 111/112. In some implementations, the configuration message may be included in an RRC message. In one example, the configuration message may be a system information block type 3 (SIB3) IE that includes a speedStateReselectionPars field, and the speedStateReselectionPars field may include a mobilityStateParameters IE. In another example, a measurement configuration (MeasConfig) IE may include a speedStatePars IE, and the speedStatePars may include the mobilityStateParameters IE. In yet another example, the speedStatePars IE may be included in a variable measurement configuration (VarMeasConfig) IE. An example of the mobilityStateParameters IE is shown by table 3(a), and the mobility state parameters of mobilityStateParameters IE are described in table 3(b).

TABLE 3(a)

MobilityStateParameters information element

```
-- ASN1START
MobilityStateParameters ::=  SEQUENCE {
    t-Evaluation             ENUMERATED {
                                s30, s60, s120, s180, s240, spare3, spare2, spare1},
    t-HystNormal             ENUMERATED {
                                s30, s60, s120, s180, s240, spare3, spare2, spare1},
    n-CellChangeMedium       INTEGER (1..16),
    n-CellChangeHigh         INTEGER (1..16),
    n-TRPChangeMedium        INTEGER (1..M),
    n-TRPChangeHigh          INTEGER (1..N)
}
-- ASN1STOP
```

TABLE 3(b)

| Parameter | Description |
|---|---|
| t-Evaluation | the duration for evaluating criteria to enter mobility states in seconds; value in seconds, where s30 corresponds to 30 seconds and so on; corresponds to the parameter $T_{CRmax}$. |
| t-HystNormal | An additional duration for evaluating criteria to enter normal mobility state in seconds; value in seconds, where s30 corresponds to 30 seconds and so on; corresponds to the parameter $T_{CRmaxHyst}$. |
| n-CellChangeHigh | the number of cell changes to enter a high mobility state; corresponds to the parameter $N_{CR\_H}$. |
| n-CellChangeMedium | the number of cell changes to enter a medium mobility state; corresponds to the parameter $N_{CR\_M}$. |
| n-TRPChangeHigh | the number of TRP changes to enter a high mobility state. |
| n-TRPChangeMedium | the number of TRP changes to enter a medium mobility state. |

Furthermore, the SIB3 IE, the MeasConfig IE, or the VarMeasConfig IE may also include a SpeedStateScaleFactors IE in a timeToTrigger-SF field, which may concern or include factors (for example, scaling factors) to be applied when the UE 101 is in medium or high speed state. These scaling factors may be used for scaling one or more mobility control related parameters. An example of the SpeedStateScaleFactors IE is shown by table 4(a), and the scaling factor (SF) parameters of the SpeedStateScaleFactors IE are described by table 4(b).

TABLE 4(a)

SpeedStateScaleFactors information element

```
-- ASN1START
SpeedStateScaleFactors ::=  SEQUENCE {
    sf-Medium               ENUMERATED {oDot25, oDot5, oDot75, lDot0},
    sf-High                 ENUMERATED {oDot25, oDot5, oDot75, lDot0},
}
-- ASN1STOP
```

TABLE 4(b)

| Parameter | Description |
|---|---|
| sf-High | The concerned mobility control related parameter is multiplied with this factor if the UE is in High Mobility state; Value oDot25 corresponds to 0.25, oDot5 corresponds to 0.5, oDot75 corresponds to 0.75 and so on. |
| sf-Medium | The concerned mobility control related parameter is multiplied with this factor if the UE is in Medium Mobility state as defined in TS 36.304 [4]. Value oDot25 corresponds to 0.25, oDot5 corresponds to 0.5, oDot75 corresponds to 0.75 and so on. | may be used to adjust (for example, increase or decrease) the TRP or beam switching thresholds. Additionally, the particular scaling factors that are used may be based on the location of the UE 101 within a cell, for example, the scaling factors for UEs located at a cells edge may be greater than the scaling factors for UEs that are closer to the center of the cell. An example of the mobilityStateParameters IE for such embodiments is shown by table 5(a), and the mobility state parameters of this version of the mobilityStateParameters IE are described in table 5(b). Additionally, an example of the SpeedStateScaleFactors IE for these embodiments shown by table 6(a), and the SF parameters of the SpeedStateScaleFactors IE for such embodiments are described by table 6(b).

TABLE 5(a)

MobilityStateParameters information element

```
-- ASN1START
MobilityStateParameters ::=        SEQUENCE {
    t-Evaluation                       ENUMERATED {
                                           s30, s60, s120, s180, s240, spare3, spare2, spare1},
    t-HystNormal                       ENUMERATED {
                                           s30, s60, s120, s180, s240, spare3, spare2, spare1},
    n-CellChangeMedium                 INTEGER (1..16),
    n-CellChangeHigh                   INTEGER (1..16),
    weightedCellCountList              SET {
        weightedCellCountCell              SEQUENCE {
            physCellID                         PhysCellId
            n-BeamChange-High                  INTEGER (1..N),
            n-BeamChange-Medium                INTEGER (1..N),
            n-TRPChange-High                   INTEGER (1..M),
            n-TRPChange-Medium                 INTEGER (1..M)
        }
    }
}
-- ASN1STOP
```

In other embodiments, where weighted cell counts based on the number of TRP/beam switches within a cell are used, additional or alternative scaling factors may be configured. These scaling factors may be used so that cell size may be taken may be taken into account for the mobility state estimation. Taking cell size into account for the mobility state estimation may be useful for networks or deployment areas that have multiple cells with different cell sizes. Using cell size estimates may also be useful since the number of beam or TRP switches may not accurately reflect the actual mobility state of the UE 101.

In such embodiments, the network may configure individual beam switching MSE thresholds and/or individual TRP switching MSE thresholds for individual cells, as well as individual scaling factors for the individual beam/TRP switching MSE thresholds. The scaling factors may be based on the network's knowledge of the cell size of an individual cell, a threshold number of beam switches that may (or should) be required to traverse an individual cell, and/or a known or estimated location of the UE 101 within a particular cell.

For example, the network may know that a particular cell is relatively large and may set a relatively large beam switching threshold for this cell since a UE is likely to undergo a large number of beam switches as the UE traverses the cell. However, a UE in a particular cell may switch beams numerous times for reasons other than traversing the cell, for example, due to poor channel conditions, coverage holes, etc. In this regard, the scaling factors TABLE 5(b)

| Parameter | Description |
|---|---|
| t-Evaluation | The duration for evaluating criteria to enter mobility states in seconds; value in seconds, where s30 corresponds to 30 seconds and so on; corresponds to the parameter $T_{CRmax}$. |
| t-HystNormal | An additional duration for evaluating criteria to enter normal mobility state in seconds; value in seconds, where s30 corresponds to 30 seconds and so on; corresponds to the parameter $T_{CRmaxHyst}$. |
| n-CellChangeHigh | The number of cell changes to enter a high mobility state; corresponds to the parameter $N_{CR\_H}$. |
| n-CellChangeMedium | The number of cell changes to enter a medium mobility state; corresponds to the parameter $N_{CR\_M}$. |
| weightedCellCountList | List of cells to consider for weighted cell count for Mobility State Estimation. |
| weightedCellCountCell | Individual cell to consider for weighted cell count for Mobility State Estimation. |
| physCellID | Physical cell identity of the cell to be considered for Mobility State Estimation. |
| n-BeamChange-Medium | The number of beam switches to enter a medium mobility state. |
| n-BeamChange-High | The number of beam switches to enter a high mobility state. |
| n-TRPChange-Medium | The number of TRP switches in the given cell to enter a medium mobility state. |
| n-TRPChange-High | The number of TRP switches in the given cell to enter a high mobility state. |

TABLE 6(a)

| SpeedStateScaleFactors information element |
|---|

```
-- ASN1START
SpeedStateScaleFactors ::=        SEQUENCE {
    sf-Medium                         ENUMERATED {oDot25, oDot5, oDot75, lDot0},
    sf-High                           ENUMERATED {oDot25, oDot5, oDot75, lDot0},
    weightedCellCountList             SET {
        weightedCellCountCell             SEQUENCE {
            sf-BeamChange-Medium              ENUMERATED {oDot25, oDot5, oDot75, lDot0, ...},
            sf-BeamChange-High                ENUMERATED {oDot25, oDot5, oDot75, lDot0, ...},
            sf-TRPChange-Medium               ENUMERATED {oDot25, oDot5, oDot75, lDot0, ...},
            sf-TRPChange-High                 ENUMERATED {oDot25, oDot5, oDot75, lDot0, ...},
        }
}
-- ASN1STOP
```

TABLE 6(b)

| Parameter | Description |
|---|---|
| sf-High | The concerned mobility control related parameter is multiplied with this factor if the UE is in High Mobility state; Value oDot25 corresponds to 0.25, oDot5 corresponds to 0.5, oDot75 corresponds to 0.75 and so on. |
| sf-Medium | The concerned mobility control related parameter is multiplied with this factor if the UE is in Medium Mobility state as defined in TS 36.304 [4]. Value oDot25 corresponds to 0.25, oDot5 corresponds to 0.5, oDot75 corresponds to 0.75 and so on. |
| sf-TRPChange-Medium | Scaling factor to be applied to the TRP switch count for Mobility State Estimation. The concerned mobility control related parameter is multiplied with this factor if the UE is in Medium Mobility state; value oDot25 corresponds to 0.25, oDot5 corresponds to 0.5, oDot75 corresponds to 0.75 and so on. |
| sf-TRPChange-High | Scaling factor to be applied to the TRP switch count for Mobility State Estimation. The concerned mobility control related parameter is multiplied with this factor if the UE is in High Mobility state; value oDot25 corresponds to 0.25, oDot5 corresponds to 0.5, oDot75 corresponds to 0.75 and so on. |
| sf-BeamChange-Medium | Scaling factor to be applied to the beam switch count for Mobility State Estimation. The concerned mobility control related parameter is multiplied with this factor to if the UE is in Medium Mobility state; value oDot25 corresponds to 0.25, oDot5 corresponds to 0.5, oDot75 corresponds to 0.75 and so on. |
| sf-BeamChange-High | Scaling factor to be applied to the beam switch count for Mobility State Estimation. The concerned mobility control related parameter is multiplied with this factor if the UE is in High Mobility state; value oDot25 corresponds to 0.25, oDot5 corresponds to 0.5, oDot75 corresponds to 0.75 and so on. |

In the examples of tables 5(a) and 6(a), some of the information included in the mobilityStateParameters IE and/or the SpeedStateScaleFactors IE may be omitted based on the particular MSE embodiment that is used for performing the MSE. These MSE embodiments are discussed in more detail infra with respect to operation 1325.

At operation 1315, the processor circuitry of the UE 101 may increment a mobility counter for each handover or cell reselection that occurs, for each transmission-reception point (TRP) switch that occurs, and/or for each beam switch that occurs. In embodiments, the processor circuitry 101 may implement an individual counters for each handover/cell reselection, TRP switch, and beam switch.

In first MSE embodiments, the mobility counter may only be used to count the number of handovers or cell reselections, and the processor circuitry of the UE 101 may increment the mobility counter when a new cell ID is obtained during an attachment procedure.

In second MSE embodiments, a mobility counter may only be used to count the number of TRP switches, and the processor circuitry of the UE 101 may increment the mobility counter when a TRP identifier is obtained during a TRP switching procedure or after successful completion the TRP switching procedure.

In third MSE embodiments, a first mobility counter may be used to count the number of cell reselections/handovers and a second mobility counter may be used to count a number of beam switches that occur. In these embodiments, the processor circuitry of the UE 101 may increment the first mobility counter may increment the mobility counter when a new cell ID is obtained during an attachment procedure or after successful completion of a handover or cell reselection procedure, and the processor circuitry may increment the second mobility counter after successful completion of a beam switching or beam recovery procedure.

In fourth MSE embodiments, a first mobility counter may be used to count the number of cell reselections/handovers and a second mobility counter may be used to count a number of TRP switches that occur. In these embodiments, the processor circuitry of the UE 101 may increment the first mobility counter may increment the mobility counter when a new cell ID is obtained during an attachment procedure or after successful completion of a handover or cell reselection procedure, and the processor circuitry may increment the second mobility counter after successful completion of a TRP switching procedure.

In fifth MSE embodiments, a first mobility counter may be used to count the number of cell reselections/handovers, a second mobility counter may be used to count a number of TRP switches that occur, and a third mobility counter may be used to count a number of beam switches that occur. In these embodiments, the processor circuitry of the UE 101 may increment the first mobility counter may increment the mobility counter when a new cell ID is obtained during an attachment procedure or after successful completion of a handover or cell reselection procedure; the processor circuitry may increment the second mobility counter after successful completion of a TRP switching procedure; and the processor circuitry may increment the third mobility counter after successful completion of a beam switching or beam recovery procedure.

Referring back to FIG. 13, at operation 1320, the processor circuitry of the UE 101 may determine whether the MSE time period has expired, which may be based on the value of the t-Evaluation and/or the t-HystNormal parameters discussed previously. If at operation 1320 the processor circuitry determines that the time period has not expired, the processor circuitry may loop back to operation 1315 to increment the mobility counter(s) based on cell, TRP, and/or beam switches. If at operation 1320 the processor circuitry determines that the time period has not expired, the processor circuitry may proceed to operation 1325 to estimate a current mobility state based on the MSE thresholds, the value(s) of the mobility state counter(s), and/or the estimated cell size.

According to the first MSE embodiments, the processor circuitry may estimate the mobility state in a similar manner as in LTE implementations, except that the cell reselections are based on the number of cell IDs that the UE 101 obtains. For example, the processor circuitry may estimate the mobility state to be the medium mobility when the number of cell reselections during time period of t-Evaluation exceeds the value of n-CellChangeMedium, but does not exceed the value of n-CellChangeHigh; and may estimate the mobility state to be the high mobility state when the number of cell reselections during the time period t-Evaluation exceeds the value of n-CellChangeHigh. The processor circuitry may estimate the mobility state to be the normal mobility state when the neither of the medium or high mobility states are determined, such as when the number of cell reselections during time period of t-Evaluation is less than or equal to the value of n-CellChangeMedium. In the first MSE embodiments, operation 1325 may be omitted.

According to the second MSE embodiments, the processor circuitry may estimate the mobility state in a similar manner as in the first MSE examples, except that the mobility state may be based on the number TRP switches. For example, the processor circuitry may estimate the mobility state to be the medium mobility when the number of cell reselections during time period of t-Evaluation exceeds the value of n-TRPChangeMedium, but does not exceed the value of n-TRPChangeHigh; and may estimate the mobility state to be the high mobility state when the number of cell reselections during the time period t-Evaluation exceeds the value of n-TRPChangeHigh. The processor circuitry may estimate the mobility state to be the normal mobility state when the neither of the medium or high mobility states are determined, such as when the number of cell reselections during time period of t-Evaluation is less than or equal to the value of n-TRPChangeMedium. In the second MSE embodiments, operation 1325 may be omitted.

According to the third MSE embodiments, the processor circuitry may estimate the mobility state based on the beam switch count of current serving cell. In these embodiments, the processor circuitry may apply the sf-BeamChange-High and the sf-BeamChange-Medium to the beam switch count of the beam mobility counter, and may compare these values to the n-BeamChange-High and the n-BeamChange-Medium values, respectively. For example, the processor circuitry may estimate the mobility state to be the medium mobility when the number of beam switches that is adjusted using the sf-BeamChange-Medium during time period of t-Evaluation exceeds the value of n-BeamChange-Medium, but does not exceed the value of n-BeamChange-High (which may or may not be adjusted using the sf-BeamChange-High). The processor circuitry may estimate the mobility state to be the high mobility state when the number of beam switches that is adjusted using the sf-BeamChange-High during the time period t-Evaluation exceeds the value of n-BeamChange-High. The processor circuitry may estimate the mobility state to be the normal mobility state when the neither of the medium or high mobility states are determined, such as when the number of beam switches during time period of t-Evaluation is less than or equal to the adjusted value of n-BeamChange-Medium. In the third MSE embodiments, operation 1325 may be omitted since the individual scaling factors are based on the cell size. Additionally, the TRP related thresholds and scaling factors may be omitted from the mobilityStateParameters IE and/or the SpeedStateScaleFactors IE in the third embodiments.

According to the fourth MSE embodiments, the processor circuitry may estimate the mobility state based on the TRP switch count of current serving cell. In these embodiments, the processor circuitry may apply the sf-TRPChange-High and the sf-TRPChange-Medium to the TRP switch count of the TRP mobility counter, and may compare these values to the n-TRPChange-High and the n-TRPChange-Medium values, respectively. For example, the processor circuitry may estimate the mobility state to be the medium mobility when the number of TRP switches that is adjusted using the sf-TRPChange-Medium during time period of t-Evaluation exceeds the value of n-TRPChange-Medium, but does not exceed the value of n-TRPChange-High (which may or may not be adjusted using the sf-TRPChange-High). The processor circuitry may estimate the mobility state to be the high mobility state when the number of TRP switches that is adjusted using the sf-TRPChange-High during the time period t-Evaluation exceeds the value of n-TRPChange-High. The processor circuitry may estimate the mobility state to be the normal mobility state when the neither of the medium or high mobility states are determined, such as when the number of beam switches during time period of t-Evaluation is less than or equal to the value of the adjusted n-TRPChange-Medium. In the fourth MSE embodiments, operation 1325 may be omitted since the individual scaling factors are based on the cell size. Additionally, the beam related thresholds and scaling factors may be omitted from the mobilityStateParameters IE and/or the SpeedStateScaleFactors IE in the fourth embodiments.

The fifth MSE embodiments may include a combination of the third and fourth MSE embodiments discussed previously. In the fifth embodiments, the processor circuitry may apply the sf-BeamChange-High and the sf-BeamChange-Medium to the beam switch count of the beam mobility counter, where the adjusted values may be compared to the n-BeamChange-High and the n-BeamChange-Medium values, respectively; and the processor circuitry may apply the sf-TRPChange-High and the sf-TRPChange-Medium to the TRP switch count of the TRP mobility counter, where these adjusted values may be compared to the n-TRPChange-High and the n-TRPChange-Medium values, respectively.

In these embodiments, the processor circuitry may estimate the mobility state to be the medium mobility when both the adjusted number of TRP switches and the adjusted number of beam switches during time period of t-Evaluation exceeds the value of n-TRPChange-Medium and the value of n-BeamChange-Medium, respectively, and do not exceed the (adjusted or non-adjusted) value of n-TRPChange-High and the (adjusted or non-adjusted) value of n-BeamChange-High, respectively. Additionally, the processor circuitry may estimate the mobility state to be the high mobility state when both the adjusted number of TRP switches and the adjusted number of beam switches during the time period t-Evaluation exceeds the adjusted value of n-TRPChange-High and the adjusted value of n-BeamChange-High, respectively. Similar to the other MSE embodiments, the processor circuitry may estimate the mobility state to be the normal mobility state when neither the high mobility state nor the medium mobility stated are determined.

According to sixth MSE embodiments, the processor circuitry may estimate the cell size at operation 1325, which may be used to adjust the mobility state estimation. In these embodiments, the processor circuitry may estimate the cell size based on the number of TRPs of a particular cell and/or the number of beam switches that were counted at operation 1315. In embodiments, the configuration message may indicate the number of TRPs for corresponding cell IDs or measurement objects. The number of TRPs per cell ID may be included in the MeasConfig IE, the mobilityStateParameters IE, or some other suitable IE or data structure.

As discussed previously, cell size estimation at operation 1325 may be based on the number of TRPs within a cell and/or the number of beam switches that take place within the cell. In some cases, the UE could estimate that a particular cell is relatively large when a large number of beam switches take place within that cell. In other words, in some embodiments, an estimated cell size may increase as the number of counted beam switches increases. In other cases, the UE may count relatively few beam or TRP switches, which may be due to the UE moving along the cell's edge. These cases may exist where a RAN node is deployed in such a manner that the trajectory for UE handovers to that cell is at the cell edge, which may be indicative of a relatively small cell.

In addition to the above, the above beam and TRP related embodiments may be performed by the UE 101 when the UE 101 is in a connected mode (for example, an RRC_CONNECTED mode, or the like). However, when the UE 101 is in an idle mode for example, an RRC_IDLE mode, or the like), the UE 101 may not be able to perform or have knowledge of the TRP or beam related information. In these cases, the UE 101 may know the change of the highest signal values in each block within L blocks, and may use the L index change as the beam change or switch as the beam information discussed previously. In alternative embodiments, the processor circuitry may use the beam switching count regardless of the current network beams.

Some non-limiting examples are provided infra. The following examples pertain to further embodiments. Specifics in the examples may be used anywhere in one or more embodiments discussed previously. All optional features of devices described herein may also be implemented with respect to one or more methods or processes, and vice versa.

Example 1 may include one or more computer-readable storage media, "CRSM", having instructions that, when executed by one or more processors of a user equipment, "UE", is to cause the UE to: identify, from a received radio resource control, "RRC", message, a conditional handover, "CHO", command, wherein the CHO is to indicate a first condition and a second condition, wherein the first condition is to indicate a condition to execute a handover, "HO", of the CHO and the second condition is to indicate a condition to not execute the HO; and perform an HO procedure when the first condition is met before the second condition is met; and discard the CHO when the second condition is met and the first condition is not met.

Example 2 may include the one or more CRSM of example 1 and/or some other examples herein, wherein execution of the instructions is to cause the UE to: initiate a validity timer; and perform the HO procedure when the first condition is met before expiration of the validity timer, wherein the second condition comprises expiration of the validity timer.

Example 3 may include the one or more CRSM of example 2 and/or some other examples herein, wherein the validity timer corresponds with an individual target cell or an individual target beam, and execution of the instructions is to cause the UE to: perform the HO procedure with the individual target cell or the individual target beam when the first condition is met before expiration of the validity timer.

Example 4 may include the one or more CRSM of example 2 and/or some other examples herein, wherein the validity timer corresponds with a plurality of target cells or a plurality of target beams, and execution of the instructions is to cause the UE to: perform the HO procedure with a target cell of the plurality of target cells or a target beam of the plurality of target beams when the first condition is met for the target cell or the target beam before expiration of the validity timer.

Example 5 may include the one or more CRSM of any one of examples 2-4 and/or some other examples herein, wherein execution of the instructions is to cause the UE to: initiate the validity timer in response to receipt of the CHO; initiate the validity timer when a serving cell signal strength or serving beam signal strength is below a threshold indicated by the RRC message; or initiate the validity timer when a difference between a serving cell signal strength and a target cell signal or a difference between a serving beam signal strength and a target beam signal strength is within a range indicated by the RRC message.

Example 6 may include the one or more CRSM of example 1 and/or some other examples herein, wherein the second condition is met when a difference between a source cell signal-to-noise-and-interference, "SINR", and a target cell SINR becomes less than a measurement report threshold, or when a difference between a source beam SINR and a target beam SINR becomes less than another measurement report threshold.

Example 7 may include the one or more CRSM of example 1 and/or some other examples herein, wherein the second condition is met when a target cell SINR is less than or equal to a source cell SINR or when a target beam SING is less than or equal to a source beam SINR.

Example 8 may include the one or more CRSM of example 1, 6, or 7 and/or some other examples herein, wherein, when the second condition is met, execution of the instructions is to cause the UE to: control radio control circuitry to perform one or more measurements of one or more cells or one or more beams; and control transmission of a measurement report to indicate signal strengths of the one or more cells or the one or more beams.

Example 9 may include the one or more CRSM of example 8 and/or some other examples herein, wherein execution of the instructions is to cause the UE to: detect, based on the one or more measurements, a new cell that is not among the one or more cells or a new beam that is not among the one or more beams; and when a signal strength or signal quality of the new cell or the new beam is greater than or equal to a signal strength or signal quality of a service cell or serving beam, discard the CHO, and control transmission of another measurement report to indicate the signal strength or the signal quality of the new cell or the new beam.

Example 10 may include the one or more CRSM of any one of examples 1-9, wherein execution of the instructions is to cause the UE to: control transmission of a scheduling request, a random access response, or an RRC connection reestablishment message when the second condition is met.

Example 11 may include the one or more CRSM of examples 10 and/or some other examples herein, wherein, when the first condition is met, execution of the instructions is to cause the UE to: control transmission of a message to a source cell or a transmission-reception point that is to provide a source beam after performance of the HO procedure, wherein the message is to indicate successful performance of the HO procedure.

Example 12 may include an apparatus to be employed as a user equipment, "UE", the apparatus comprising: processing means for: identifying, from a received configuration message, a plurality of mobility state estimation, "MSE", thresholds, wherein each MSE threshold of the plurality of MSE thresholds corresponds to an MSE value, and determine an MSE of the UE to be an individual MSE value when a value of a mobility counter is less than or equal to an MSE threshold that corresponds with the individual MSE value; and communication means for receiving the configuration message.

Example 13 may include the apparatus of example 12 and/or some other examples herein, wherein the processing means is for: incrementing the mobility counter when a handover or cell reselection is to occur with a cell having a cell identifier (cellID) that is different than a cellID of a current serving cell.

Example 14 may include the apparatus of example 12 and/or some other examples herein, wherein the processing means is for: incrementing the mobility counter when beam selection or beam switching occurs.

Example 15 may include the apparatus of example 12 and/or some other examples herein, wherein the processing means is for: incrementing the mobility counter in response to receipt of one or more beams from a transmission-reception point, "TRP", that is different than a TRP from which the UE received another one or more beams.

Example 16 may include the apparatus of example 15 and/or some other examples herein, wherein the processing means is for: identifying, from the received configuration message, a number of beam switches or a number of TRP switches for each cell of a plurality of cells; and identifying, from the received configuration message, a scaling factor associated with a corresponding cell of the plurality of cells, wherein the scaling factor is to be applied to the MSE thresholds associated with the corresponding cell, and wherein the scaling factor for each cell is based on the number of beam switches that occur in each cell or the number of TRP switches of each cell.

Example 17 may include the apparatus of any one of examples 13-16 and/or some other examples herein, wherein the processing means is for: identifying, from the received RRC message, a number of TRPs for each cell of a plurality of cells; estimating a cell size for each cell based on the number of TRPs for each cell; and determining the MSE of the UE based on the estimated cell size.

Example 18 may include an apparatus to be employed as a radio access network node, the apparatus comprising: processing means for: determining a plurality of mobility state estimation, "MSE", thresholds, wherein each MSE threshold of the plurality of MSE thresholds corresponds to an MSE value, and generating a configuration message to indicate the plurality of MSE thresholds; and communication means for signaling the configuration message to a user equipment.

Example 19 may include the apparatus of example 18 and/or some other examples herein, wherein the processing means is for: determining a number of transmission-reception points, "TRPs", for each cell of a plurality of cells, wherein the number of TRPs for each cell are to be used for estimating a size of each cell; and generating the configuration message to indicate the number of TRPs for each cell.

Example 20 may include the apparatus of example 18 or 19 and/or some other examples herein, wherein the processing means is for: determining a threshold number of beam switches or a threshold number of TRP switches for each cell of a plurality of cells based on a size of each cell; and generating the configuration message to indicate the threshold number of beam switches or the threshold number of TRP switches.

Example 21 may include the apparatus of example 20 and/or some other examples herein, wherein the processing means is for: determining a plurality of scaling factors that are associated with a corresponding cell of the plurality of cells, wherein each of the plurality of scaling factors are to be applied to the threshold number of beam switches or the threshold number of TRP switches of corresponding cell; and generating the configuration message to indicate the plurality of scaling factors.

Example 22 may include an apparatus to be employed as a radio access network node, the apparatus comprising: radio control circuitry to receive a measurement report from a user equipment, "UE"; and processor circuitry communicatively coupled with the radio control circuitry, the processor circuitry to generate a conditional handover, "CHO", request message when the UE is to be handed over to a target radio access network node; and network controller circuitry communicatively coupled with the processor circuitry, the network controller circuitry to: send the CHO request message to the target radio access network node, and obtain, from the target radio access network node, a radio resource control, "RRC", message to be sent to the UE, wherein the RRC message is to include a CHO command, and wherein the CHO command is to indicate a CHO condition and an exit condition, wherein the CHO condition is to indicate a condition, which when fulfilled, is cause the UE to initiate a handover, "HO", with the target radio access network node, and the exit condition is to indicate a condition, which when fulfilled, is to cause the UE to discard the CHO command.

Example 23 may include the apparatus of example 22 and/or some other examples herein, wherein the radio control circuitry is to transmit the RRC message to the UE in response to receipt of the RRC message by the network controller circuitry.

Example 24 may include the apparatus of example 22 and/or some other examples herein, wherein the radio control circuitry is to receive a message from the UE to indicate successful completion of the HO with the target radio access network node, or the network controller circuitry is to obtain a message from the target radio access network node to indicate successful completion of the HO with the UE.

Example 25 may include the apparatus of any one of examples 22-24 and/or some other examples herein, the processor circuitry is to determine that the UE is to be handed over to the target radio access network node based on signal strength or signal quality measurements included in the measurement report.

Example 26 may include a method to be performed by a user equipment, "UE", the method comprising: identifying or causing to identify, from a received radio resource control, "RRC", message, a conditional handover, "CHO", command, wherein the CHO is to indicate a first condition and a second condition, wherein the first condition is to indicate a condition to execute a handover, "HO", of the CHO and the second condition is to indicate a condition to not execute the HO; performing or causing to perform an HO procedure when the first condition is met before the second condition is met; and discarding or causing to discard the CHO when the second condition is met and the first condition is not met.

Example 27 may include the method of example 26 and/or some other examples herein, further comprising: initiating or causing to initiate a validity timer; and performing or causing to perform the HO procedure when the first condition is met before expiration of the validity timer, wherein the second condition comprises expiration of the validity timer.

Example 28 may include the method of example 27 and/or some other examples herein, wherein the validity timer corresponds with an individual target cell or an individual target beam, and the method comprises: performing or causing to perform the HO procedure with the individual target cell or the individual target beam when the first condition is met before expiration of the validity timer.

Example 29 may include the method of example 27 and/or some other examples herein, wherein the validity timer corresponds with a plurality of target cells or a plurality of target beams, and the method comprises: performing or causing to perform the HO procedure with a target cell of the plurality of target cells or a target beam of the plurality of target beams when the first condition is met for the target cell or the target beam before expiration of the validity timer.

Example 30 may include the method of any one of examples 27-29 and/or some other examples herein, further comprising: initiating or causing to initiate the validity timer in response to receipt of the CHO; initiating or causing to initiate the validity timer when a serving cell signal strength or serving beam signal strength is below a threshold indicated by the RRC message; or initiating or causing to initiate the validity timer when a difference between a serving cell signal strength and a target cell signal or a difference between a serving beam signal strength and a target beam signal strength is within a range indicated by the RRC message.

Example 31 may include the method of example 26 and/or some other examples herein, wherein the second condition is met when a difference between a source cell signal-to-noise-and-interference, "SINR", and a target cell SINR becomes less than a measurement report threshold, or when a difference between a source beam SINR and a target beam SINR becomes less than another measurement report threshold.

Example 32 may include the method of example 26 and/or some other examples herein, wherein the second condition is met when a target cell SINR is less than or equal to a source cell SINR or when a target beam SING is less than or equal to a source beam SINR.

Example 33 may include the method of examples 26-32 and/or some other examples herein, wherein, when the second condition is met, and the method comprises: performing or causing to perform one or more measurements of one or more cells or one or more beams; and transmitting or causing to transmit a measurement report to indicate signal strengths of the one or more cells or the one or more beams.

Example 34 may include the method of example 33 and/or some other examples herein, further comprising: detecting or causing to detect, based on the one or more measurements, a new cell that is not among the one or more cells or a new beam that is not among the one or more beams; and when a signal strength or signal quality of the new cell or the new beam is greater than or equal to a signal strength or signal quality of a service cell or serving beam, discarding or causing to discard the CHO, and transmitting or causing to transmit another measurement report to indicate the signal strength or the signal quality of the new cell or the new beam.

Example 35 may include the method of any one of examples 26-24, further comprising: transmitting or causing to transmit a scheduling request, a random access response, or an RRC connection reestablishment message when the second condition is met.

Example 36 may include the method of examples 35 and/or some other examples herein, wherein, when the first condition is met, the method comprises: transmitting or causing to transmit a message to a source cell or a transmission-reception point that is to provide a source beam after performance of the HO procedure, wherein the message is to indicate successful performance of the HO procedure.

Example 37 may include a method to be performed by a user equipment, "UE", the apparatus comprising: identifying or causing to identify, from a received configuration message, a plurality of mobility state estimation, "MSE", thresholds, wherein each MSE threshold of the plurality of MSE thresholds corresponds to an MSE value; determining or causing to determine an MSE of the UE to be an individual MSE value when a value of a mobility counter is less than or equal to an MSE threshold that corresponds with the individual MSE value; and receiving or causing to receive the configuration message.

Example 38 may include the method of example 37 and/or some other examples herein, wherein the method comprises: incrementing or causing to increment the mobility counter when a handover or cell reselection is to occur with a cell having a cell identifier (cellID) that is different than a cellID of a current serving cell.

Example 39 may include the method of example 38 and/or some other examples herein, wherein the method comprises: incrementing or causing to increment the mobility counter when beam selection or beam switching occurs.

Example 40 may include the method of example 38 and/or some other examples herein, wherein the method comprises: incrementing or causing to increment the mobility counter in response to receipt of one or more beams from a transmission-reception point, "TRP", that is different than a TRP from which the UE received another one or more beams.

Example 41 may include the method of example 40 and/or some other examples herein, wherein the further comprising: identifying or causing to identify, from the received configuration message, a number of beam switches or a number of TRP switches for each cell of a plurality of cells; and identifying or causing to identify, from the received configuration message, a scaling factor associated with a corresponding cell of the plurality of cells, wherein the scaling factor is to be applied to the MSE thresholds associated with the corresponding cell, and wherein the scaling factor for each cell is based on the number of beam switches that occur in each cell or the number of TRP switches of each cell.

Example 42 may include the method of any one of examples 38-41 and/or some other examples herein, wherein the method comprises: identifying or causing to identify, from the received RRC message, a number of TRPs for each cell of a plurality of cells; estimating or causing to estimate a cell size for each cell based on the number of TRPs for each cell; and determining or causing to determine the MSE of the UE based on the estimated cell size.

Example 43 may include a method to be performed by a radio access network node, the method comprising: determining or causing to determine a plurality of mobility state estimation, "MSE", thresholds, wherein each MSE threshold of the plurality of MSE thresholds corresponds to an MSE value; generating or causing to generate a configuration message to indicate the plurality of MSE thresholds; and signaling or causing to signal the configuration message to a user equipment.

Example 44 may include the method of example 43 and/or some other examples herein, further comprising: determining or causing to determine a number of transmission-reception points, "TRPs", for each cell of a plurality of cells, wherein the number of TRPs for each cell are to be used for estimating a size of each cell; and generating or causing to generate the configuration message to indicate the number of TRPs for each cell.

Example 45 may include the method of example 43 or 44 and/or some other examples herein, further comprising: determining or causing to determine a threshold number of beam switches or a threshold number of TRP switches for each cell of a plurality of cells based on a size of each cell; and generating or causing to generate the configuration message to indicate the threshold number of beam switches or the threshold number of TRP switches.

Example 46 may include the method of example 45 and/or some other examples herein, further comprising: determining or causing to determine a plurality of scaling factors that are associated with a corresponding cell of the plurality of cells, wherein each of the plurality of scaling factors are to be applied to the threshold number of beam switches or the threshold number of TRP switches of corresponding cell; and generating or causing to generate the configuration message to indicate the plurality of scaling factors.

Example 47 may include an apparatus comprising means to perform one or more elements of a method described in or related to any of examples 1-46, or any other method or process described herein. Example 48 may include one or more non-transitory computer-readable media comprising instructions to cause an electronic device, upon execution of the instructions by one or more processors of the electronic device, to perform one or more elements of a method described in or related to any of examples 1-46, or any other method or process described herein. Example 49 may include an apparatus comprising logic, modules, or circuitry to perform one or more elements of a method described in or related to any of examples 1-46, or any other method or process described herein. Example 50 may include a method, technique, or process as described in or related to any of examples 1-46, or portions or parts thereof. Example 51 may include an apparatus comprising: one or more processors and one or more computer readable media comprising instructions that, when executed by the one or more processors, cause the one or more processors to perform the method, techniques, or process as described in or related to any of examples 1-46, or portions thereof. Example 52 may include a signal as described in or related to any of examples 1-46, or portions or parts thereof. Example 53 may include a signal in a wireless network as shown and described herein. Example 54 may include a method of communicating in a wireless network as shown and described herein. Example 55 may include a system for providing wireless communication as shown and described herein. Example 56 may include a device for providing wireless communication as shown and described herein.

The foregoing description of the above examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the embodiments discussed herein.

The invention claimed is:

1. One or more non-transitory computer-readable storage media (NTCRSM) comprising instructions, wherein execution of the instructions by one or more processors of a user equipment (UE) is to cause the UE to:
   identify, from a received radio resource control (RRC) message, a conditional handover (CHO) command, wherein the CHO command is to indicate a first condition and a second condition, wherein the first condition is to indicate a condition to execute a handover (HO) of the CHO command and the second condition is to indicate a condition to not execute the HO, wherein the first condition and the second condition are based at least in part on a determination of how long a network should reserve resources for the UE in consideration of handover performance;
   monitor the first condition and the second condition, and
   perform an HO procedure when the first condition is met before the second condition is met, or
   discard the CHO command when the second condition is met and the first condition is not met.

2. The one or more NTCRSM of claim 1, wherein execution of the instructions is to cause the UE to:
   initiate a validity timer; and
   perform the HO procedure when the first condition is met before expiration of the validity timer,
   wherein the second condition comprises expiration of the validity timer.

3. The one or more NTCRSM of claim 2, wherein the validity timer corresponds with an individual target cell or an individual target beam, and execution of the instructions is to cause the UE to:
   perform the HO procedure with the individual target cell or the individual target beam when the first condition is met before expiration of the validity timer.

4. The one or more NTCRSM of claim 2, wherein the validity timer corresponds with a plurality of target cells or a plurality of target beams, and execution of the instructions is to cause the UE to:
   perform the HO procedure with a target cell of the plurality of target cells or a target beam of the plurality of target beams when the first condition is met for the target cell or the target beam before expiration of the validity timer.

5. The one or more NTCRSM of claim 2, wherein execution of the instructions is to cause the UE to:
   initiate the validity timer in response to receipt of the CHO command;
   initiate the validity timer when a serving cell signal strength or serving beam signal strength is below a threshold indicated by the RRC message; or
   initiate the validity timer when a difference between a serving cell signal strength and a target cell signal or a difference between a serving beam signal strength and a target beam signal strength is within a range indicated by the RRC message.

6. The one or more NTCRSM of claim 2, wherein duration of the validity timer is based at least in part on a tradeoff between a time duration needed to reserve resources for the HO and providing a sufficient amount of time so that the UE may properly perform the HO in order to a avoid radio link failure.

7. The one or more NTCRSM of claim 1, wherein the second condition is met when a difference between a source cell signal-to-noise-and-interference (SINR) and a target cell SINR becomes less than a measurement report threshold, or when a difference between a source beam SINR and a target beam SINR becomes less than another measurement report threshold.

8. The one or more NTCRSM of claim 1, wherein the second condition is met when a target cell SINR is less than or equal to a source cell SINR or when a target beam SINR is less than or equal to a source beam SINR.

9. The one or more NTCRSM of claim 1, wherein, when the second condition is met, execution of the instructions is to cause the UE to:
control radio control circuitry to perform one or more measurements of one or more cells or one or more beams; and
control transmission of a measurement report to indicate signal strengths of the one or more cells or the one or more beams.

10. The one or more NTCRSM of claim 9, wherein execution of the instructions is to cause the UE to:
detect, based on the one or more measurements, a new cell that is not among the one or more cells or a new beam that is not among the one or more beams; and
when a signal strength or signal quality of the new cell or the new beam is greater than or equal to a signal strength or signal quality of a service cell or serving beam,
discard the CHO command, and
control transmission of another measurement report to indicate the signal strength or the signal quality of the new cell or the new beam.

11. The one or more NTCRSM of claim 1, wherein execution of the instructions is to cause the UE to:
control transmission of a scheduling request, a random access response, or an RRC connection reestablishment message when the second condition is met.

12. The one or more NTCRSM of claim 11, wherein, when the first condition is met, execution of the instructions is to cause the UE to:
control transmission of a message to a source cell or a transmission-reception point that is to provide a source beam after performance of the HO procedure, wherein the message is to indicate successful performance of the HO procedure.

13. The one or more NTCRSM of claim 1, wherein execution of the instructions is to cause the UE to:
initiate a plurality of validity timers corresponding to a plurality of target cells or a plurality of target beams; and perform the HO procedure with a target cell of the plurality of target cells or a target beam of the plurality of target beams when the first condition is met for the target cell or the target beam before expiration of a corresponding validity timer.

14. The one or more NTCRSM of claim 13, wherein duration of each of the plurality of validity timers is different from one another.

15. A base station (BS) comprising:
a transceiver; and
processing circuitry communicatively coupled to the transceiver and configured to:
receive a measurement report from a user equipment (UE);
generate a conditional handover (CHO) request message when the UE is to be handed over to a target base station; and
send the CHO request message to the target base station, and
obtain, from the target base station, a radio resource control (RRC) message to be sent to the UE, wherein the RRC message is to include a CHO command, and wherein the CHO command is to indicate a CHO condition and an exit condition, wherein the CHO condition is to indicate a condition, which when fulfilled, is to cause the UE to initiate a handover (HO) with the target base station, and the exit condition is to indicate a condition, which when fulfilled, is to cause the UE to discard the CHO command, wherein the CHO condition and the exit condition are based at least in part on a determination of how long a network should reserve resources for the UE in consideration of handover performance.

16. The BS of claim 15, wherein the processing circuitry is further configured to transmit the RRC message to the UE in response to receipt of the RRC message by the processing circuitry.

17. The BS of claim 15, wherein the processing circuitry is further configured to receive a message from the UE to indicate successful completion of the HO with the target base station, or to obtain a message from the target base station to indicate successful completion of the HO with the UE.

18. The BS of claim 15, the processing circuitry is further configured to determine that the UE is to be handed over to the target base station based on signal strength or signal quality measurements included in the measurement report.

19. The BS of claim 15, wherein the processing circuitry is further configured to send an instruction to the target base station to release a target resource when the exit condition is fulfilled or when the CHO condition is not fulfilled.

20. The BS of claim 19, wherein the instruction to the target radio access network is sent using an X2/Xn message.

* * * * *